United States Patent [19]
Bishop et al.

[11] Patent Number: 5,784,552
[45] Date of Patent: Jul. 21, 1998

[54] DEBUGGING A COMPUTER PROGRAM BY SIMULATING EXECUTION FORWARDS AND BACKWARDS IN A MAIN HISTORY LOG AND ALTERNATIVE HISTORY LOGS

[75] Inventors: John E. Bishop, Nashua, N.H.; Donald A. Carignan, Tyngsboro, Mass.

[73] Assignee: Digital Equipment Corporation, Maynard, Mass.

[21] Appl. No.: 98,501

[22] Filed: Jul. 28, 1993

[51] Int. Cl.[6] ................................................ G06F 11/00
[52] U.S. Cl. ...................................................... 395/183.14
[58] Field of Search ................................................. 371/19

[56] References Cited

U.S. PATENT DOCUMENTS

| | | | |
|---|---|---|---|
| 4,080,650 | 3/1978 | Beckett | 395/500 |
| 4,308,581 | 12/1981 | Raghunathan | 395/575 |
| 4,866,665 | 9/1989 | Haswell-Smith | 395/575 |
| 5,038,348 | 8/1991 | Yoda et al. | 371/19 |
| 5,124,989 | 6/1992 | Padawer et al. | 371/19 |
| 5,148,528 | 9/1992 | Fite et al. | 395/375 |

FOREIGN PATENT DOCUMENTS

WO 90/01738  2/1990  WIPO ................................. G06F 5/00

OTHER PUBLICATIONS

Jong-Deok Choi et al., "Techniques for Debugging Parallel Programs with Flowback Analysis," ACM Transactions on Programming Languages & Systems, vol. 13, No. 4 (Oct. 1991), Association for Computing Machinery, New York, pp. 491–530.

Colin Hunter et al., "DOS at RISC," BYTE (Nov. 1989), McGraw-Hill, Inc., Peterborough, New Hampshire, p. 361–368.

Steven S. Muchnick et al., "Program Flow Analysis: Theory and Applications," Prentice-Hall, Inc., Englewood Cliffs, New Jersey (1981), pp. 160–297.

Henry M. Levy et al., Computer Programming and Architecture, The VAX 11, Digital Equipment Corp., Maynard, Mass. (1980), pp. 255, 282, 371–383.

R.M. Balzer, "EXDAMS—EXtendable Debugging and Monitoring System," AFIPS Proceedings, Spring Joint Computer Conference (1969) vol. 33, AFIPS Press, Montvale, N.J., pp. 567–580.

*Primary Examiner*—Robert B. Harrell
*Attorney, Agent, or Firm*—Gary E. Ross

[57] ABSTRACT

A computer program is executed in a forward direction to create a current state of registers and memory for the program. During the forward execution of the program, the pre-existing values of registers and memory changed by each instruction are recorded in a main log. During interactive debugging, reverse execution is simulated by displaying the contents of specified registers or memory locations. For each specified register or memory location, the main log is searched in a forward direction beginning at a specified time in the past and continuing until a value is found, or until the end of the main log is reached and a value is taken from the current state for the computer program. After simulated execution in reverse, the user may specify a changed value for a specified register or memory location, and then forward instruction interpretation is begun using the changed value, without changing the current state. New values of registers and memory locations generated by forward interpretation are recorded in an alternative log. Values of registers and memory accessed by forward-interpreted instructions are fetched by first searching the alternative log in a reverse direction, and when a value is not found in the alternative log, the main log is searched in a forward direction as described above. Moreover, at any time during forward interpretation, the user may specify a changed value, the change is logged in an alternative log, and forward interpretation continues.

22 Claims, 29 Drawing Sheets

```
            NEG  ZRO  OVF  CAR
             1    0    0    0

PC=8934 4598                    SP=3865  2F87

R0=2357 9A7F          [SP    ]=8502 9885
            R1=0000 0000          [SP+  4]=74F2 301B
            R2=9843 C613          [SP+  8]=4290 7945
            R3=5872 90D4          [SP+ 12]=0000 0000
            R4=4682 3154          [SP+ 16]=0000 0000

M=7842 0128

[M    ]=5983 B681
                     [M+  4]=5831 35FB
                     [M+  8]=9035 892F
                     [M+ 12]=CD54 AEOC
                     [M+ 16]=0000 0000
```

```
         MOVL   SIZE, R0
         DECL   R0
         MOVAL  LIST, R1
         CLRL   R2
         ADDL3  #1, R2, R3
OUTER:   CMPL   (R1)[R2], (R1)[R3]
INNER:   BLEQ   CONTINUE
         MOVL   (R1)[R2], TEMP
         MOVL   (R1)[R3], (R1)[R2]
         MOVL   TEMP, (R1)[R3]

CONTINUE:
         AOBLEQ R0, R3, INNER
         AOBLSS R0, R2, OUTER
```

F1=STEP FORWARDS          F2=STEP BACKWARDS           F3=CHANGE DISPLAY
F4=CHANGE VALUES          F5=RETURN TO ORIGINAL STATE  F6=SET BOOKMARK
F7=UPDATE STATE           F8=SINGLE STEP [ON]/OFF

FIG. 2

DEBUGGING A COMPUTER PROGRAM BY SIMULATING EXECUTION FORWARDS AND BACKWARDS IN A MAIN HISTORY LOG AND ALTERNATIVE HISTORY LOGS

BACKGROUND OF THE INVENTION

1. Field of the Invention

The present invention relates to operating a digital computer in a debugging mode that permits a programmer to step through a program while viewing the contents of registers and selected memory locations. The present invention more particularly relates to a debugging mode that permits the programmer to step forwards and backwards through a program.

2. Description of the Background Art

Software debugging tools give an application programmer a controlled testing environment. Typically, the application program instructions are executed alternately or interleaved with routines of the debugging tool that inspect or display the values of registers or selected memory locations. Computer processors typically provide a debugging trap in which execution is passed to a debugging trap routine after execution of each application program instruction. For a computer processor that does not provide such a hardware trap, a similar function can be specified by software interrupt instructions inserted into the application program. In any case, the debugging trap or interrupt routine can inspect or display the values of registers or selected memory locations after execution of each application program instruction, and then pass execution back to the next application program instruction by executing a return instruction. In a single-step mode, the debug trap or interrupt routine waits for a command from the user before returning to the next application program instruction.

Flowback analysis has been used in debuggers for higher-level programming languages in order to analyze how information flows through the program. A debugger employing flowback analysis is described in R. M. Balzer, "EXDAMS—Extendable Debugging and Monitoring System," AFIPS Proceedings, Spring Joint Computer Conference, 1969, Vol 33, AFIPS Press, Montvale N.J., pp. 567–580. Debugging statements are added to the program to pass relevant run-time information to run-time history-gathering routines. The information is collected in a buffer that is written out when full. This history tape of the program's behavior, together with a symbol table and model, is used to recreate the program's behavior in either the forwards or backwards direction of execution time. The history contains, basically, the values of variables on the left-hand side of assignment statements, the direction (THEN or ELSE) taken in IF statements, the direction (remain in or flow out) taken at the end of DO-LOOPS, and the point from which a GOTO or a CALL was issued (to facilitate execution-time backup). The history information is assembled and displayed to the user during debug-time history-playback. In this phase, a main routine of the debugger accepts requests from processing routines for information on a certain variable or set of variables, and a direction for execution-time. Using this direction, the main routine searches the history for the next occurrence of a value change for any variable in the requested set. It returns the name of this variable, its new (or old, if executing backwards) value, and its attribute. Special calls facilitate the next subroutine call, goto, return, assignment, iteration, or conditional statement to be retrieved, so that all information in the history is retrievable through this routine. The calling routine describes what information to retrieve, and combines, processes, and formats it for the display routines that interact with the display equipment.

Although flowback analysis permits the programmer to view the values of named program variables, it does not simulate past program state, and therefore cannot recreate values in heap-allocated memory, which can be accessed in many higher-level languages, either by specific higher-level language statements, or by assembly language subroutines. The statements "PEAK" and "POKE" in the BASIC language, for example, directly access heap-allocated memory. Moreover, it is not possible to permit the programmer to change the value of a variable for some time in the past history, and then simulate execution in a forward direction merely by access to the history of variable values. Furthermore, without the ability to reconstruct the past program state, it is not possible to permit the programmer to change a previously-executed instruction, and to then begin execution in a forward direction from some point in the past. Proper reconstruction of the past program state has been insured by starting re-execution at the beginning of the program. Such re-execution of the previously-executed beginning portion of the program has required considerable processor time, especially when the debugger is collecting history information and inspecting registers or memory for a condition that would trigger interactive debugging.

SUMMARY OF THE INVENTION

In accordance with a basic aspect of the present invention, there is provided a method of executing a computer program in a forward direction in order to create a current state of registers and memory for the computer program. Before each instruction of the computer program is executed, however, pre-existing values of the registers and the memory that are changed by the instruction are recorded in a main log. By using the main log, reverse execution is simulated in order to display contents of registers or memory locations specified by a programmer during interactive debugging. The contents of the specified registers or memory locations that existed during execution of the program at a specified time in the past are reconstructed from the current state for the computer program by forward searching in the main log for entries which include values of the specified registers or memory locations. For each specified register or memory location, a forward search is made beginning in the main log at the specified time in the past and continuing until a value is found for the specified register or memory location, or until the end of the main log is reached. When the end of the main log is reached, a value for the specified register or memory location is taken from the current state for the computer program.

In accordance with another aspect of the invention, at any instruction reached during reverse execution, the programmer may specify a changed value for a specified register or memory location. Then program instruction interpretation in a forward direction is begun at that instruction using the changed value, without changing the current state for the computer program. New values of registers and memory locations generated by forward interpretation are recorded in an alternative log. Values of registers and memory accessed by forward-interpreted instructions are fetched by first searching the alternative log in a reverse direction, and when a value is not found in the alternative log, the main log is searched in a forward direction, and when a value is not found in the main log, then a value is fetched from the current state for the computer program. Moreover, at any time during forward interpretation, the programmer may specify a change in the value of a selected register or memory location, and the change may be logged in an alternative log, and forward interpretation may continue.

Forward interpretation can be reversed at any time by stepping backwards in the alternative log. When any stepped-over entry of the alternative log indicates a new value for a register or memory location being displayed to the programmer, a pre-existing value for that register or memory location is fetched by the same procedure used for fetching values of registers or memory accessed by forward-interpreted instructions, and the display to the programmer is changed to display the pre-existing value.

When forward interpretation is reversed, the "stepped-over" entries of the alternative log may or may not be removed. Memory is conserved when the alternative log is always "pruned" during reverse interpretation. When the alternative log is not always "pruned", a new alternative forward path is taken whenever the programmer specifies a change in the value of a specified register or memory location, and an additional alternative log is created for the new alternative forward path. The multiple alternative logs form a "tree" structure. Multiple alternative logs may branch from the main log. It may be desirable to permit multiple alternative logs so that the programmer may quickly revisit any previously-visited location or make a comparison between a present location and a previous location.

Because the main and alternative logs include all changes to registers and memory specified by the instructions having been executed or interpreted, it is possible to update the current state for the computer program to a state that had existed for an entry in the main log or that would exist if program execution would have followed a path to an instruction corresponding to an entry in any alternative log. The current state of the computer is updated by "rolling back" the state while scanning the main log in a reverse direction from its end, and by "rolling forward" the state while scanning in a forward direction in any and all alternative logs along the forward path. Once the state of the computer is updated, the computer may resume forward execution of the computer program from the updated state.

BRIEF DESCRIPTION OF THE DRAWINGS

Other objects and advantages of the invention will become apparent from reading the following detailed description with reference to the drawings, in which:

FIG. 2 is a front view of the screen of a video display used in the computing system of FIG. 1 when operating the computing system in accordance with the present invention;

Figure 1:
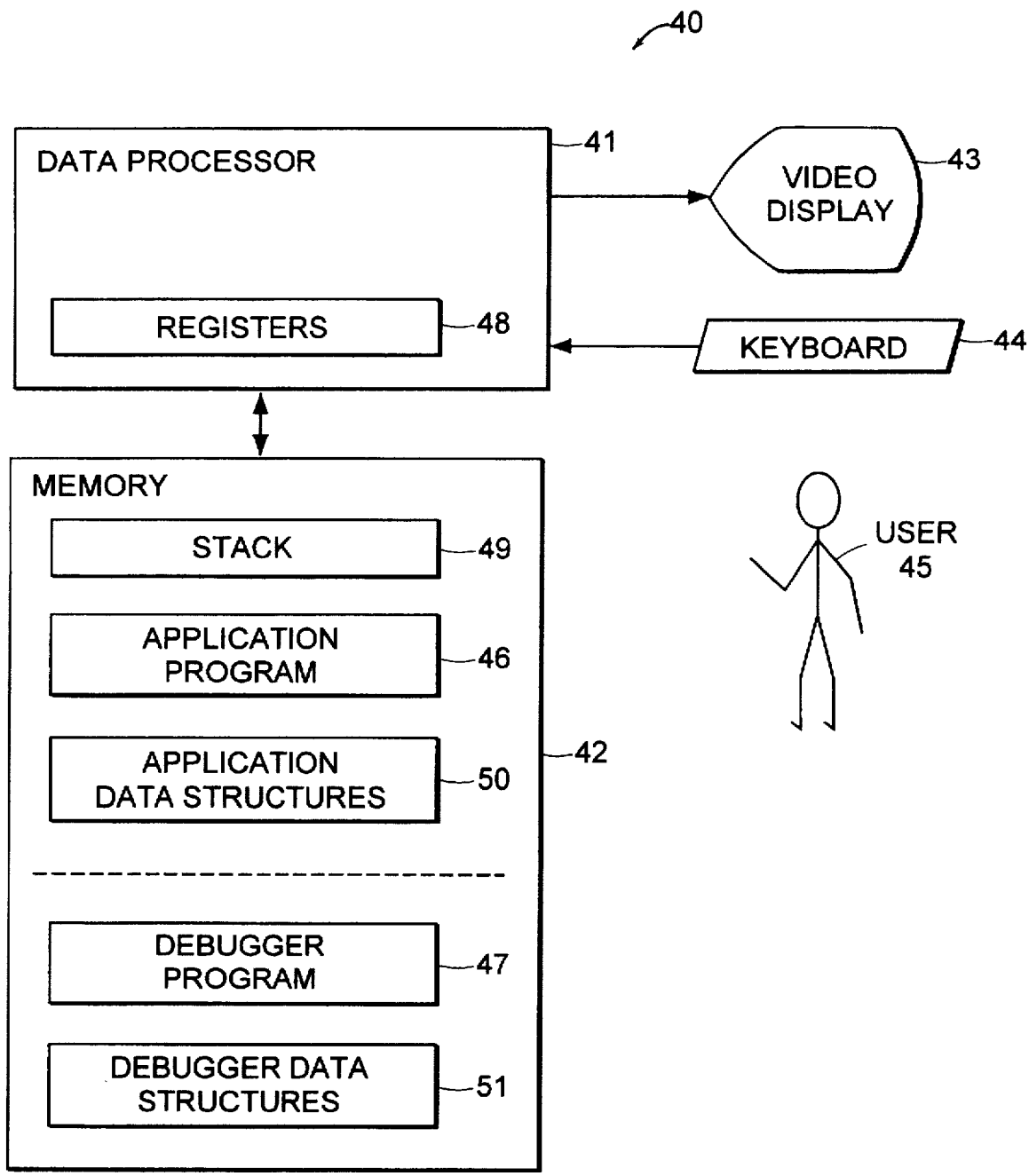
FIG. 1 is a block diagram of a digital computing system that is operated in accordance with the present invention.

While the invention is susceptible to various modifications and alternative forms, a specific embodiment thereof has been shown by way of example in the drawings and will be described in detail herein. It should be understood, however, that the invention is not limited to the particular form disclosed. On the contrary, the intention is to cover all modifications, equivalents, and alternatives falling within the scope of the invention as defined by the appended claims.

DETAILED DESCRIPTION OF THE PREFERRED EMBODIMENT

Turning now to the drawings and referring first to FIG. 1, there is shown a digital computer system generally designated 40 which includes a data processor 41, a random access memory 42, a video display 43, and a keyboard 44. The present invention more particularly concerns a method of operating the data processor 41 in order to permit a user 45 to debug an application program 46 stored in the memory 42. To debug the application program 46, the data processor 41 executes a debugger program 47 in the memory 42. During execution of the debugger program 47, the data processor 41 receives commands and data entered by the user 45 at a keyboard 44, and the data processor operates a video display 43 to display information to the user.

In order to debug the application program 46, the application program 46 is executed by the data processor 41 under the supervision of the debugger program 47. For example, execution is passed from the application program 46 to the debugger program 47, after each instruction is executed in the application program. Preferably, the data processor 41 has a so-called debugger trap that saves the state of the data processor for the application program after each instruction in the application program is executed, and then transfers execution to an entry point or trap vector in the debugger program.

The state of the data processor 41 includes the contents of various general purpose registers 48 and the contents of the memory 42 that can be accessed by the application program 46. The application program 46, for example, accesses application data structures 50. Preferably, the data processor 41 has so-called memory protection features which allocate to the application program 46 only a portion of the address space of the memory 42, and prevent the application program 46 from accessing outside its allocated address space. Therefore, if the application program 46 has a bug, it would not be possible for execution of the application program to change any of the memory allocated to the debugger program 47. The debugger program, for example, has debugger data structures 51 that are protected from access by the application program.

When execution is transferred from the application program 46 to the debugger program 47 by the debugger trap facility, the contents of the registers 48 are pushed onto a stack 49 in the memory 42. Therefore, when execution of the debugger program 47 begins at the debugger trap vector, the state of the data processor 41 for the application program 46 consists of the register values on the stack 49 and the contents of the address space allocated to the application program 46. For a "VAX" (Trademark) digital computer manufactured by Digital Equipment Corporation, for example, the state for the application program is saved in a data structure called the process control block, which is further described on page 261 of Henry M. Levy and Richard H. Eckhouse, Jr., *Computer Programming and Architecture, The VAX*-11, Digital Equipment Corporation, Maynard, Mass. (1980), incorporated herein by reference. In order to transfer execution from the debugger program 47 back to the application program, the debugger program 47 has a "return from interrupt" instruction which, when executed by the data processor 41, causes the state for the application program to be restored by unstacking the register values from the stack 49 and placing the register values back in the registers 48.

Turning now to FIG. 2, there is shown a pictorial view of the information displayed by the video display 43. This information includes an assembly language program listing 61, and a summary 62 of the state for the application program 46 at a particular point in the application program. The particular point in the application program is indicated by a pointer such as a line 63 in the program listing 61. As shown in FIG. 2, the line 63 indicates that the state is summarized for a point just after execution of the instruction "DECL R0" and before execution of the instruction "MOVAL LIST,R1".

In accordance with an aspect of the present invention, the summary 62 can include either simulated state information or the original state of the data processor resulting at the end of execution of the application program. As will be further described below, the simulated state information is obtained by reading a main log and possibly a number of alternative logs. Moreover, state information is simulated only for particular display parameters selected by the user. In general, these display parameters will include the registers of the data processor, the contents of a top portion of the stack, and selected addresses of the random access memory. The selected addresses of the random access memory could be locations assigned to "user variables," and the user may also select such locations by specifying variable names. As shown in FIG. 2, the selected state information includes the values of the condition codes "NEG ZRO OVF CAR" representing the states of the negative, zero, overflow, and carry bits in a program status register; the contents of a program counter (PC); the contents of the stack pointer register (SP); the contents of general purpose registers R0 to R4; and the contents of the first five longwords of the stack in memory. The display parameters further include an array of five longwords in memory beginning at a selected memory address (M) of 7842 0128 hexadecimal.

At the bottom of the display 43 is a menu generally designated 64 of various user-selected functions F1 to F8. The user selects the first function "step forwards" in order to change the simulated state information to state information that would exist at a program instruction in the sequence of execution following the pointer 63. The user selects the second function "step backwards" in order to display the simulated state corresponding to a point in the sequence of instruction execution prior to the location of the pointer 63.

The user selects the third function "change display" in order to change the display parameters for which the simulated state information is displayed. For example, the user may specify different registers or memory locations than the ones shown in the summary 62.

The user selects the fourth function "change values" in order to change the simulated state and then begin an alternative sequence of program interpretation. For example, the summary 62 shows that the content of the general purpose register R1 are zero. The user may specify that the content or value of the register R1 should be set to a value of one, and then execution should continue from the pointer 63 in the program listing 61 using this changed value in the register R1. In this case, the simulated state 62 shown in FIG. 2 would show that the register R1 has a value of one, and the application program will be interpreted from the point indicated by the pointer 63 using the changed value for the register R1. As will be further described below with reference to FIG. 8, the specified change, and the results of instruction interpretation, are logged in an alternative log.

The user may select the fifth function "return to original state" in order to return the summary 62 to the original state that existed at the end of execution of the application program. In addition, the pointer 63 will be moved so that it is located just under the instruction having been last executed in the application program. In a similar fashion, the user may select the sixth function "set bookmark" in order to set the summary 62 and the program pointer 63 to any simulated state or point in the program having been previously visited by the user.

The user may select the seventh function "update state" in order to change the state of the digital computer to the state that previously existed or would have existed at any point in the application program having been visited by the user. Therefore, the user may continue program execution from that point. As will be further described below, the user may wish to update the state so that forward execution will be performed instead of program interpretation using values fetched by searching through the logs. This function of updating the state may speed-up stepping through the program by reducing the number of log entries that are searched during the fetching process.

Finally, the user may wish to switch from a single-step mode to a multi-step mode. In the single-step mode, the debugger steps forward or backwards by one instruction in the program listing 61 each time that the user selects the "step forwards" or "step backwards" function. In the multi-step mode, however, the program pointer 63 will move forward or backward until either the end or the beginning of the main or an alternative log is reached, or until a watch condition is satisfied. Initially, for example, the debugger program will assume a single step mode, and when the user hits the "F8" function key on the keyboard, the user will be asked to enter a watch condition. The watch condition, for example, specifies some Boolean function of register or memory values, or instruction content. For example, the watch condition may specify that stepping forwards or backwards through the program should be halted when a specified register or memory location assumes a specified value. The watch condition may specify a "breakpoint" when the program counter register assumes a particular value. The watch condition may specify a breakpoint when a specified register or memory location is modified by, or when an instruction with a specified operation code is reached or executed, such as a call or return instruction. At the end of program execution, program interpretation, or simulated execution of each instruction in the application program, the debugger program will test the watch condition. If the watch condition is true, then the debugger program will temporarily halt program execution, interpretation, or simulated execution, and will display the summary 62 of state existing at that point in the program. The program pointer 63 will indicate the point at which the debugger program halted the execution, interpretation, or simulated execution of the application program.

Figure 3:
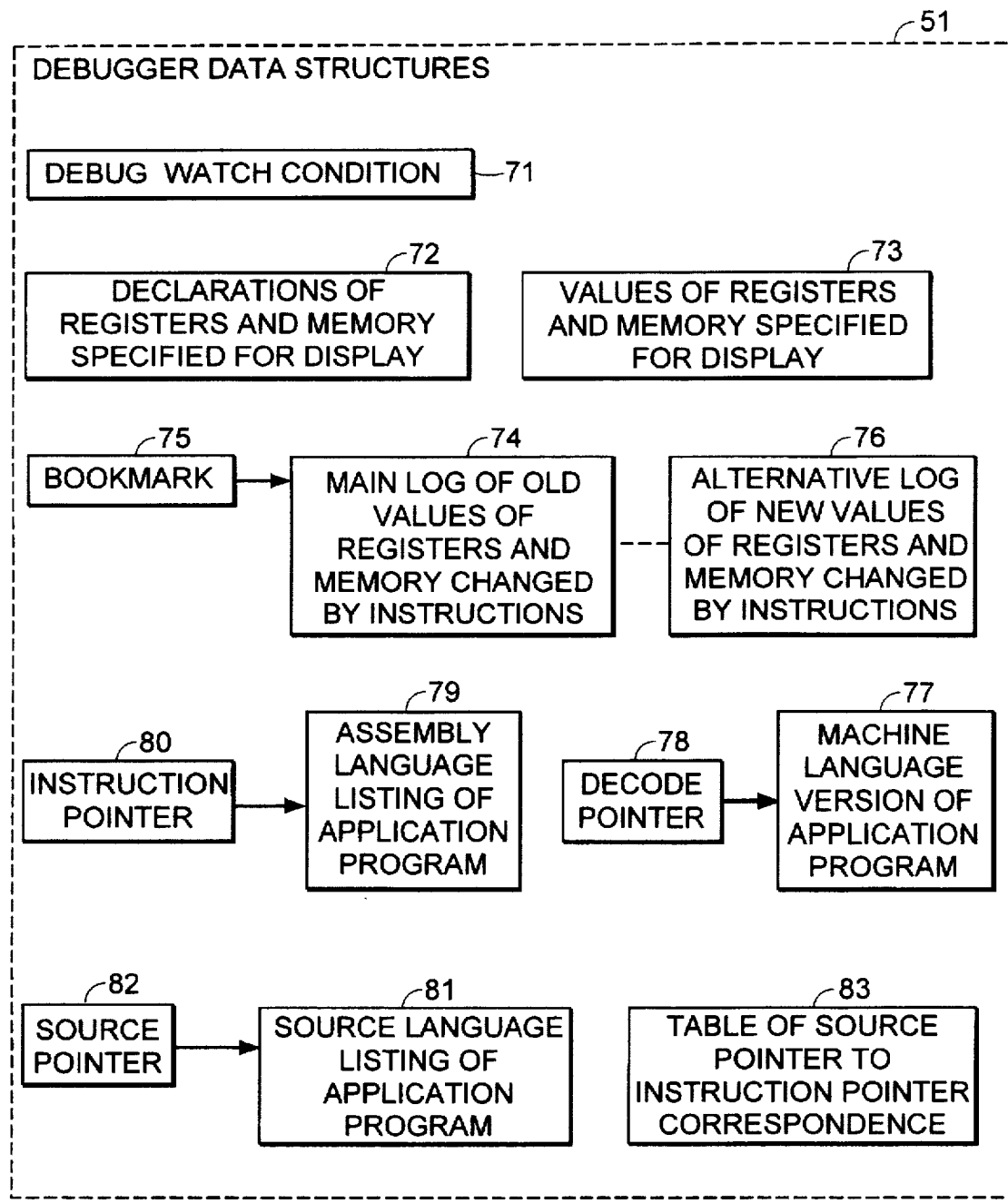
FIG. 3 is a block diagram of various data structures used by the debugger during operation of the digital computing system of FIG. 1 in accordance with the present invention.

Turning now to FIG. 3, there are shown the various debugger data structures 51. These data structures include the debug watch condition 71 specified by the user when selecting the multi-step mode. The debugger data structures further include the declarations 72 of registers and memory specified for display, and respective values 73 of the registers and memory specified for display.

The present invention more particularly concerns the use of a main log 74 of old values of registers and memory changed by instructions. From the main log 74, it is possible to simulate or reconstruct any state of the data processor having existed during logging in the main log when the application program was executed. In accordance with another aspect of the present invention, the debug data structures include at least one alternative log 76 of new values of registers and memory changed by instructions in the application program. The beginning portion of an alternative log also includes at least one change specified by the user. The position in the main log or an alternative log corresponding to the state presently being viewed by the user is indicated by a bookmark 75 that points to a particular log entry.

The main log 74 and the alternative log 76 are generated during execution or interpretation, respectively, of machine instructions. These machine instructions are included in a machine language version 77 of the application program. The next byte of the machine code to be decoded is indicated by a decode pointer 78. The debugger data structures 51 also include an assembly language listing 79 of the application program. The next assembly language instruction to be executed is indicated by an instruction pointer 80.

The present invention could also be used for debugging source language programs. In this case, the debugger data structures 51 also include a source language listing 81 of the application program, and the next source language statement to be executed is indicated by a source pointer 82. The assembly language listing 79 is generated by compiling the source language listing 81. When the source language listing is compiled, the compiler also generates a table 83 of the instruction pointer value corresponding to each source pointer value. The table 83, for example, could be used for single-stepping through the source language listing 81 instead of through the assembly language listing 79. In other words, instead of displaying the assembly language listing 61 in FIG. 2, the source language listing 81 could be displayed. In the single step mode, the simulated state would advance forward or backward to the instruction in the assembly language listing corresponding to the next or the previous source language statement. In this case, the "watch condition" 71 would be true when the instruction pointer 80 is equal to an instruction pointer value in the table 83.

Figure 4:
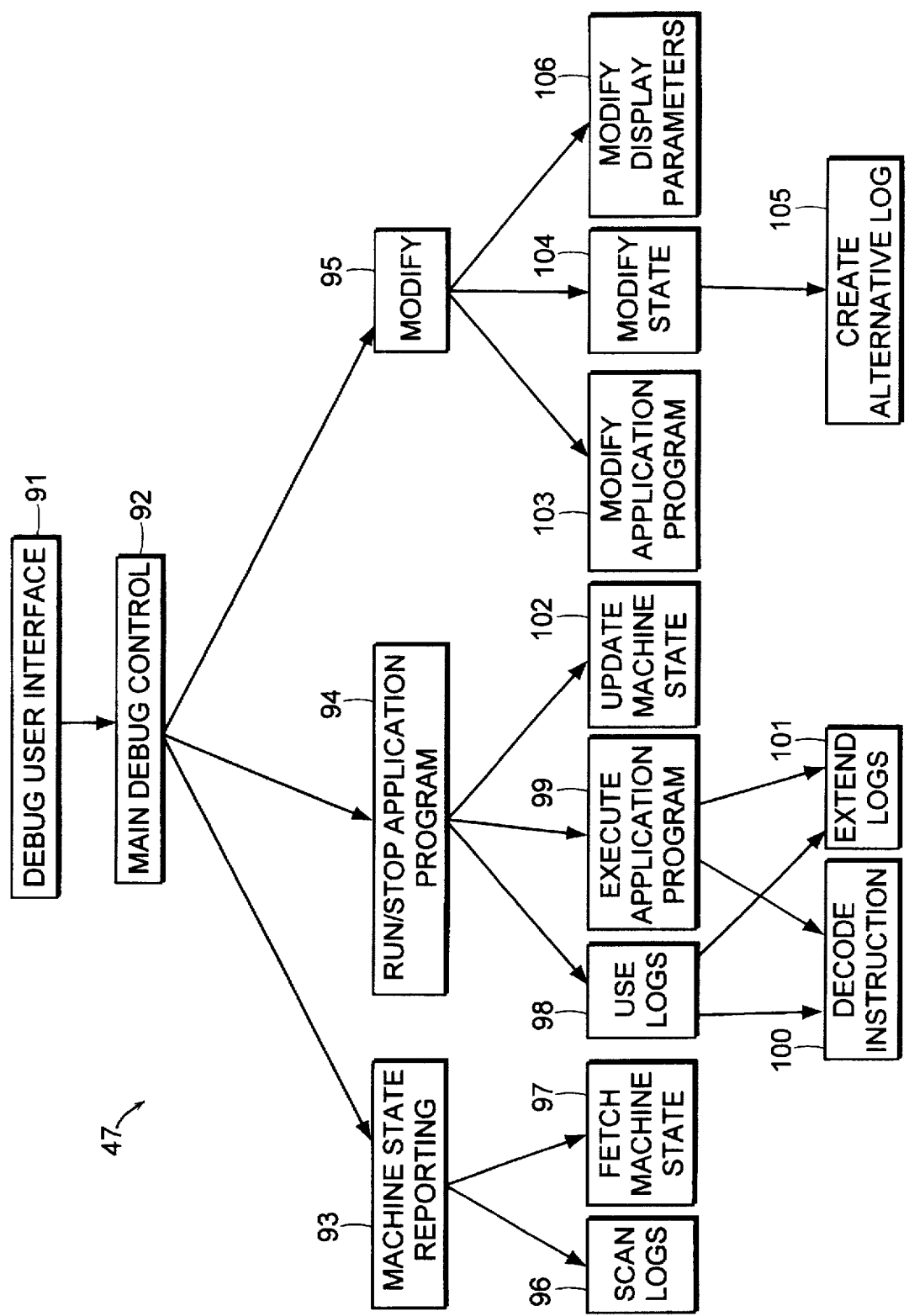
FIG. 4 is a block diagram of various program functions used in controlling the digital computing system of FIG. 1 in accordance with the present invention.

Turning now to FIG. 4, there are shown various functions performed by the debugger program 47. The highest level function is a debug user interface 91 that communicates directly with the user. User commands are passed from the user interface 91 to a main debug control 92. The debug control 92 decodes and executes the user commands for machine state reporting 93 (functions F5 and F6), running and stopping the application program 94 (functions F1, F2, and F7), and for performing modifications 95 (functions F3, F4, and F8). The machine state reporting 93 requires scanning 96 of the logs and fetching 97 machine state. The running and stopping 94 of the application program requires use 98 of the logs and execution 99 of the application program. When the logs are used for running and stopping of the application program, the instructions are decoded 100 to determine the registers and memory changed by each instruction, and the logs are extended 101 in order to record the old values or the new values of the registers and memory changed by each instruction. The main log is extended when the user specifies changed values and the application program is executed, and one or more alternative logs are extended when the application program is interpreted during the use of the logs. The machine state is updated 102 during execution of the application program. The machine state can also be updated by using the logs.

The user may modify 103 the application program, for example, to fix a bug discovered during debugging. The user may modify 104 the simulated state for the computer program. In this case, the debugger creates 105 an alternative log based upon the modified state. The user may further modify 106 the display parameters.

Figure 5:
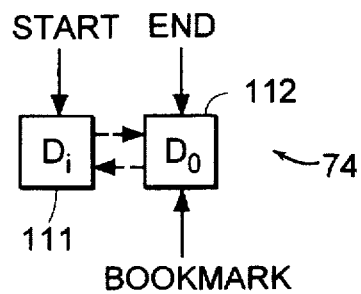
FIG. 5 is a schematic diagram of a main log when the main log is empty.

Turning now to FIG. 5, there is shown a preferred format for the initial state of the main log 74. In accordance with an important aspect of the present invention, the main log 74 is extended during program execution. Preferably, the main log is a double-linked list. Although the main log could be in the form of a file, a double-linked list is preferred so that entries can be easily inserted into or removed from the main log.

Before logging begins, the main log has an initial entry 111 at the start of the log, and a terminal entry 112 at the end of the log. These entries are designated as dummy entries $D_i$ and $D_o$, because they do not include any change information. They include pointers and flags that are set to indicate the start and the end of the log.

Figure 6:
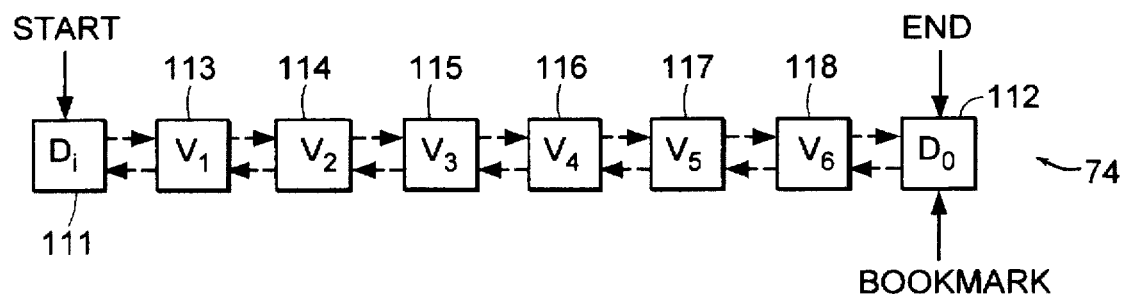
FIG. 6 is a schematic diagram of the main log when a number of entries have been added to the main log during forward execution.

Logging in the main log 74 starts at the beginning of execution or at some mid-point during execution of the application program, and continues until the end of execution of the application program. At the end of execution, for example, the main log 74 may have the contents as shown in FIG. 6. In this case, six entries 113 to 118 have been added to the main log. Each entry specifies a register or memory location, and an old value for the register or memory location. The value for a memory location, for example, is a longword aligned on longword address boundaries. The entry includes a flag indicating whether the value is for a register or for a memory location, and the associated register number or memory address. These old values are designated $V_1$ to $V_6$ in FIG. 6. In other words, before the state for the computer program is changed by execution of an instruction, the old value of the register or memory being changed by the instruction is recorded in an entry in the main log 74. As further shown in FIG. 6, at the end of execution, the bookmark points to the terminal entry 112. The bookmark indicates the state that is displayed to the user. At the end of execution, the state displayed to the user is the state generated by the application program.

Figure 7:
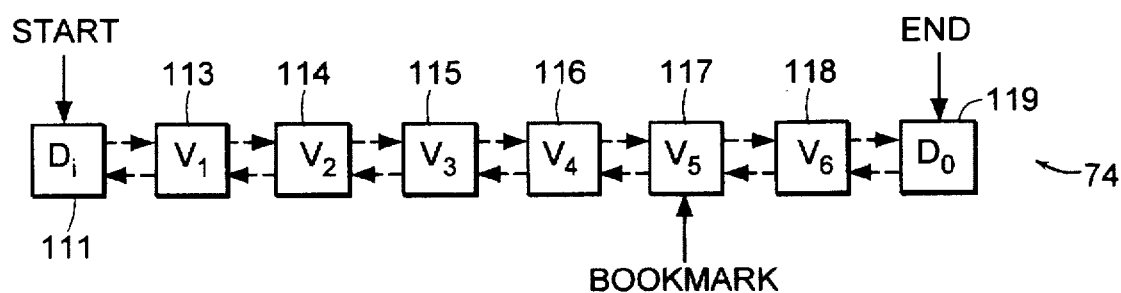
FIG. 7 is a schematic diagram of the main log of FIG. 6 after reverse execution.

As shown in FIG. 7, backward execution of the computer program can be simulated by advancing the bookmark to an intermediate entry 117 of the main log 74. In this case, the debugger will generate a simulated state corresponding to the state for the application program that existed and included the old values $V_5$ and $V_6$.

Figure 8:
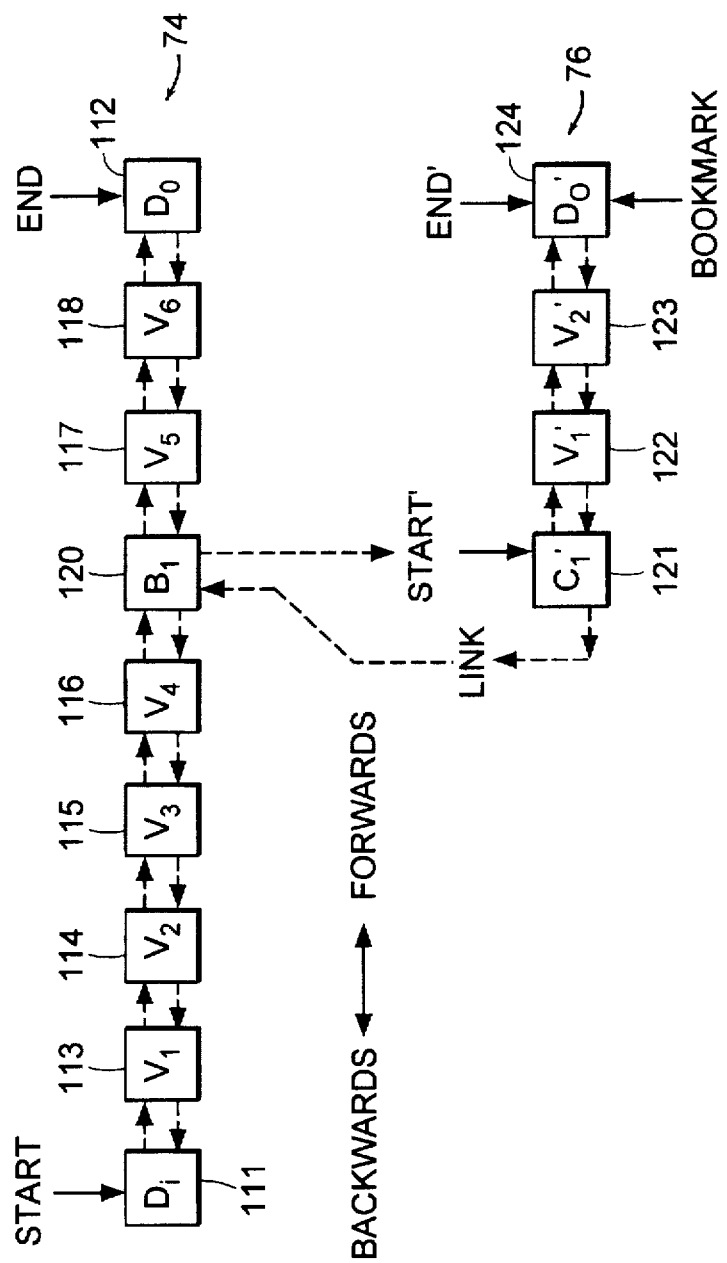
FIG. 8 is a schematic diagram of the main log of FIG. 7 after an alternative log has been appended to the main log and forward interpretation has occurred using certain changed values.

In accordance with a further aspect of the present invention, the user may specify a change to the state for the application program. As shown in FIG. 8, for example, when the bookmark was pointing to the entry 117 of the main log 74, the user specified a change $C_1'$. In response to this specified change, the debugger created the alternative log 76 branching from the main log 74 at a branch entry 120 inserted in the main log. The alternative log includes a change entry 121 including the change specified by the user, an entry 122 including a new value $V_1'$, an entry 123 including a new value $V_2'$, and a terminal entry 124, which includes a dummy entry $D_o'$. The change entry 121 includes a link pointer (LINK) pointing back to the branch entry 120 in the main log. The new values $V_1'$, and $V_2'$ are generated by interpreting the application program.

During the interpretation of the application program, the original state for the application program is not changed. Instead, during forward interpretation, values of registers or memory accessed by the instructions are fetched from the logs, as further described below with reference to FIG. 10, and new values generated by the instructions are stored in the alternative log 76 and are not written into the original state for the application program.

Figure 9:
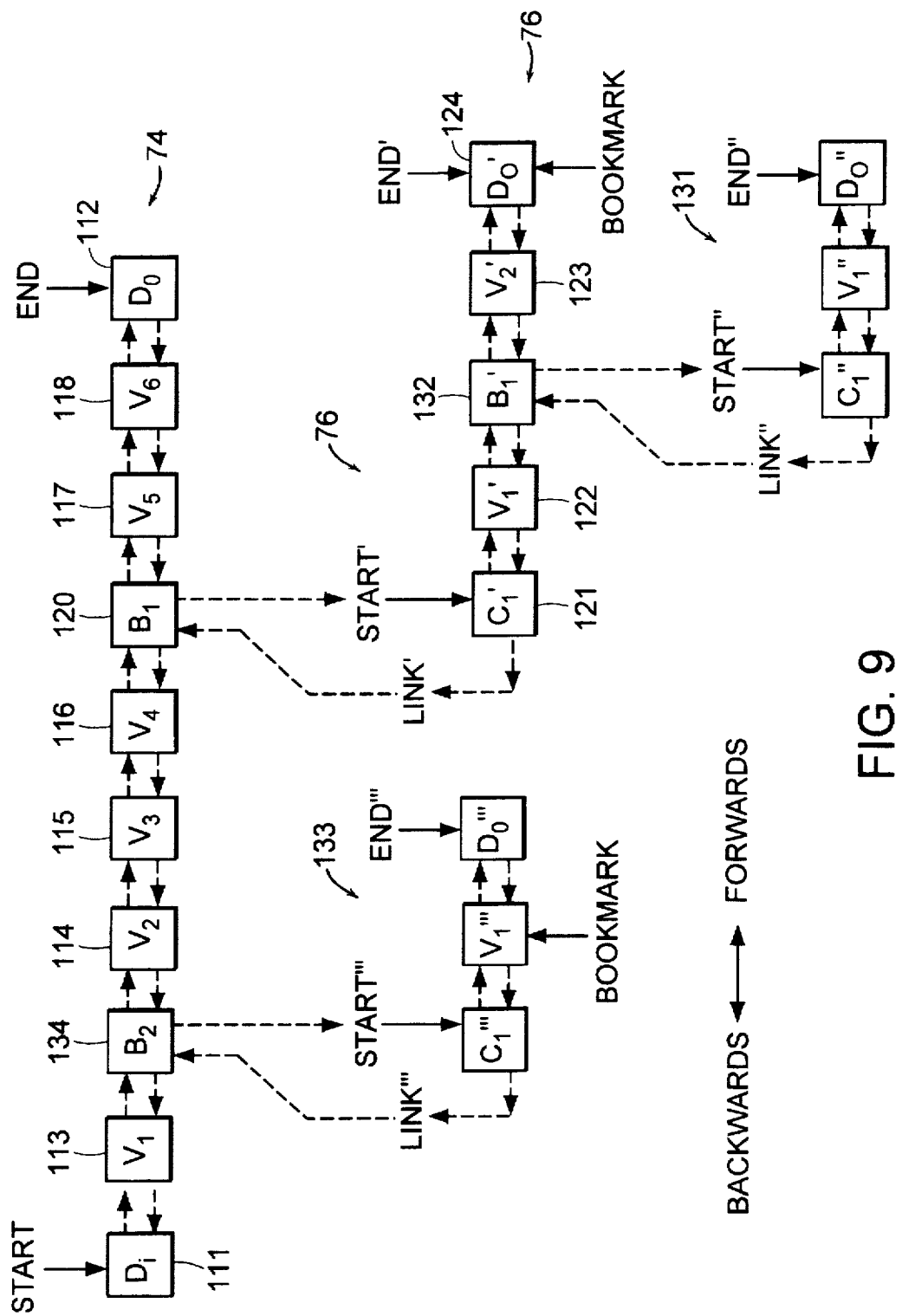
FIG. 9 is a pictorial view of the main log and the original alternative log of FIG. 8 after additional alternative logs have been appended at branch points in the main log and in the original alternative log.

Turning now to FIG. 9, there is shown a schematic diagram of the main log and the original alternative log 76 after further debugging. A second alternative log generally designated 131 has branched from a branch entry 132 inserted into the original alternative log 76. Moreover, a third alternative log 133 has branched from a branch entry 134 inserted into the main log 74. Whenever the user is viewing the simulated state in the main log or in an alternative log, or is viewing the original state at the end of the main log, a new alternative log is started when the user specifies a change to a register or memory location.

Figure 10:
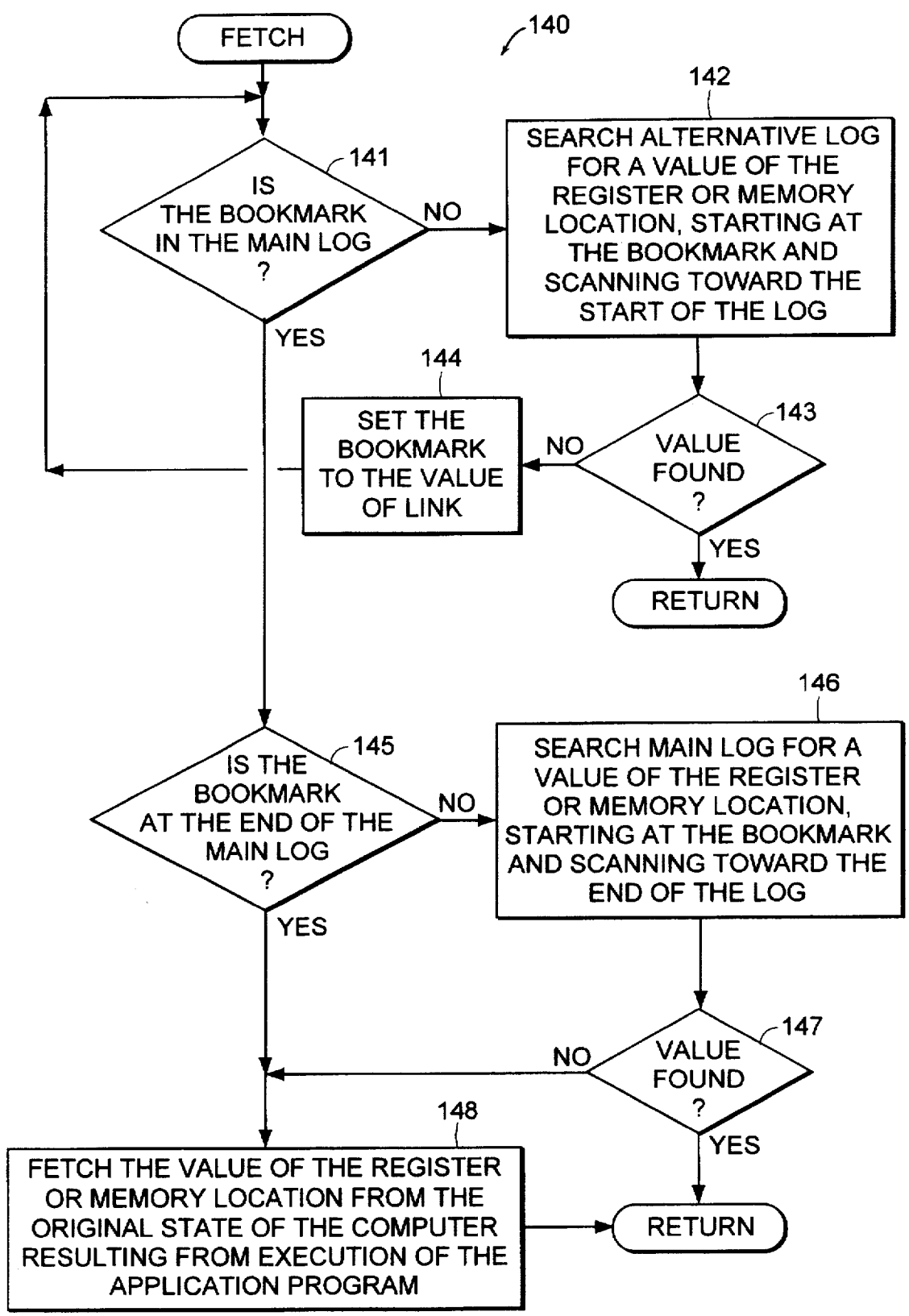
FIG. 10 is a flowchart of a low-level subroutine for fetching the content of a specified register or memory location.

Turning now to FIG. 10, there is shown a flowchart generally designated 140 of a subroutine that uses the logs for fetching the value of a specified register or memory location. In the first step 141, the log entry pointed to by the bookmark is inspected to determine whether the bookmark points to the main log, or points to an alternative log. For example, each entry in the main log and the alternative log have an identifier indicating the type of log and type of entry as follows:

TABLE I

| ENTRY ID | TYPE OF ENTRY |
| --- | --- |
| 0 | START - MAIN LOG |
| 1 | END - MAIN LOG |
| 2 | VALUE - MAIN LOG |
| 3 | BRANCH - MAIN LOG |
| 4 | CHANGE - ALTERNATIVE LOG |
| 5 | END - ALTERNATIVE LOG |
| 6 | VALUE - ALTERNATIVE LOG |
| 7 | BRANCH - ALTERNATIVE LOG |

When the bookmark is not in the main log, it is in an alternative log. The alternative log includes new values for registers and memory locations generated by interpreting instructions. Therefore, in step 142, the alternative log is searched for a value of the register or memory location being fetched, starting at the bookmark and scanning toward the start of the log. Scanning is performed in the reverse direction towards the change entry for the log because new values are stored in the alternative log, and therefore the most recent value in the alternative log must be fetched. In step 143, execution returns if a value is found for the register or memory location being fetched. Otherwise, if scanning reaches the change entry at the start of the alternative log without finding a value for the specified register memory location, then it is necessary to scan in the log from which the alternative log branches. Therefore, in step 144, the bookmark is set to the value of the link pointer in the first change entry of the alternative log.

Execution then loops back to step 141. Eventually, either a value will be found in an alternative log, or execution will continue from step 141 to step 145. In step 145, execution branches depending on whether the bookmark is at the end of the main log. If the bookmark is not at the end of the main log, then in step 146, the main log is searched for a value of the register or memory location being fetched, starting at the bookmark and scanning toward the end of the main log. The values in the main log are old values, and therefore the searching in step 146 searches in a forward direction in time because the entries in the main log include the old values of registers or memory being changed by instructions. In contrast, the alternative log was searched in step 142 in a reverse direction with respect to time, because the values in the entries in an alternative log are new values. In step 147, execution returns if a value for the register or memory location being fetched is found during the search of the main log. Otherwise, execution branches to step 148. Step 148 is also reached when step 145 determines that the bookmark is at the end of the main log. In step 148, the value of the register or memory location being fetched is fetched from the state of the computer having resulted at the end of execution of the application program. After step 148, execution returns.

Figure 11:
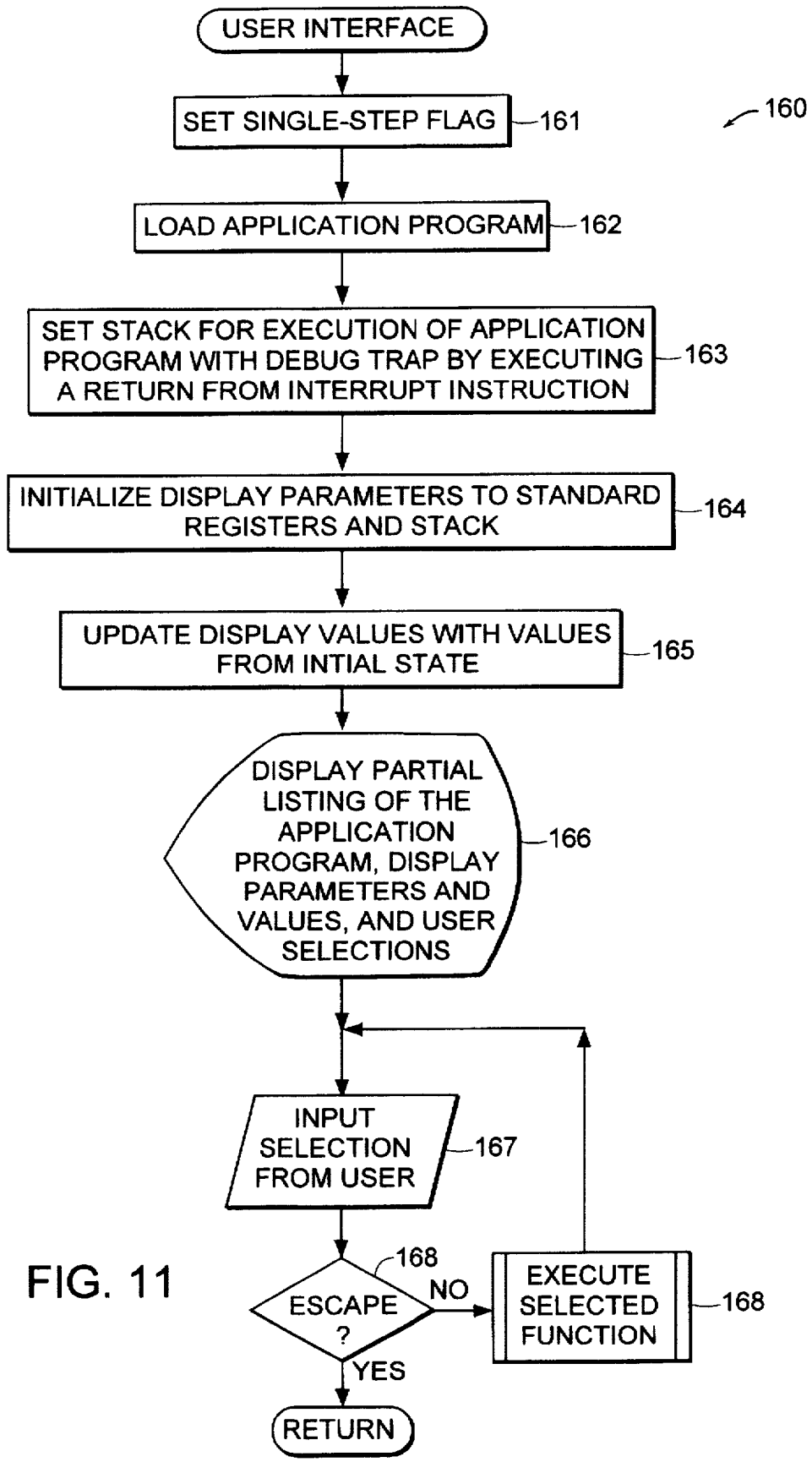
FIG. 11 is a flowchart of a top-level user interface routine.

Turning now to FIG. 11, there is shown a flowchart generally designated 160 for the user interface (91 in FIG.

4). In a first step 161, a single-step flag is set. Then in step 162, the application program (46 in FIG. 1) is loaded into memory (42 in FIG. 1). Then in step 163, the stack (49 in FIG. 1) is set for execution of the application program with a debug trap enabled by executing a return from interrupt instruction. In other words, the entry or starting address of the application program is placed in the stack 49 at the location where the program counter would be loaded into the stack upon interrupt of the application program. Therefore, when the data processor 41 executes a return from interrupt instruction (as further described below with reference to FIG. 14), execution will be transferred from the debugger program (47 in FIG. 1) to the application program (46 in FIG. 1). Moreover, the program status word for the application program is set to enable the debug trap. At this time, the program status word for the application program resides at a position in the stack (49 in FIG. 1) where the program status word would have been loaded by an interrupt of the application program.

Next, in step 164, the display parameters (72 in FIG. 3) are initialized to standard registers and stack. In other words, the display will initially display the values of the condition codes, the program counter, the stack pointer, the general purpose registers, and the top of the stack as viewed by the application program, as shown in FIG. 2. Then in step 165, the display values are updated with values from the initial state. The initial state will be the state set in the stack in step 163. Then in step 166, the data processor displays a partial listing of the application program, the display parameters and values, and the menu of user selections, similar to that shown in FIG. 2. Then in step 167, the data processor receives an input selection from the user. If the user hits an escape key, as tested in step 168, then execution returns to a higher level routine, such as an operating system menu. Otherwise, in step 168, the selection from the user is executed, and execution loops back to step 167 for further interactive debugging of the application program.

Figure 12A:
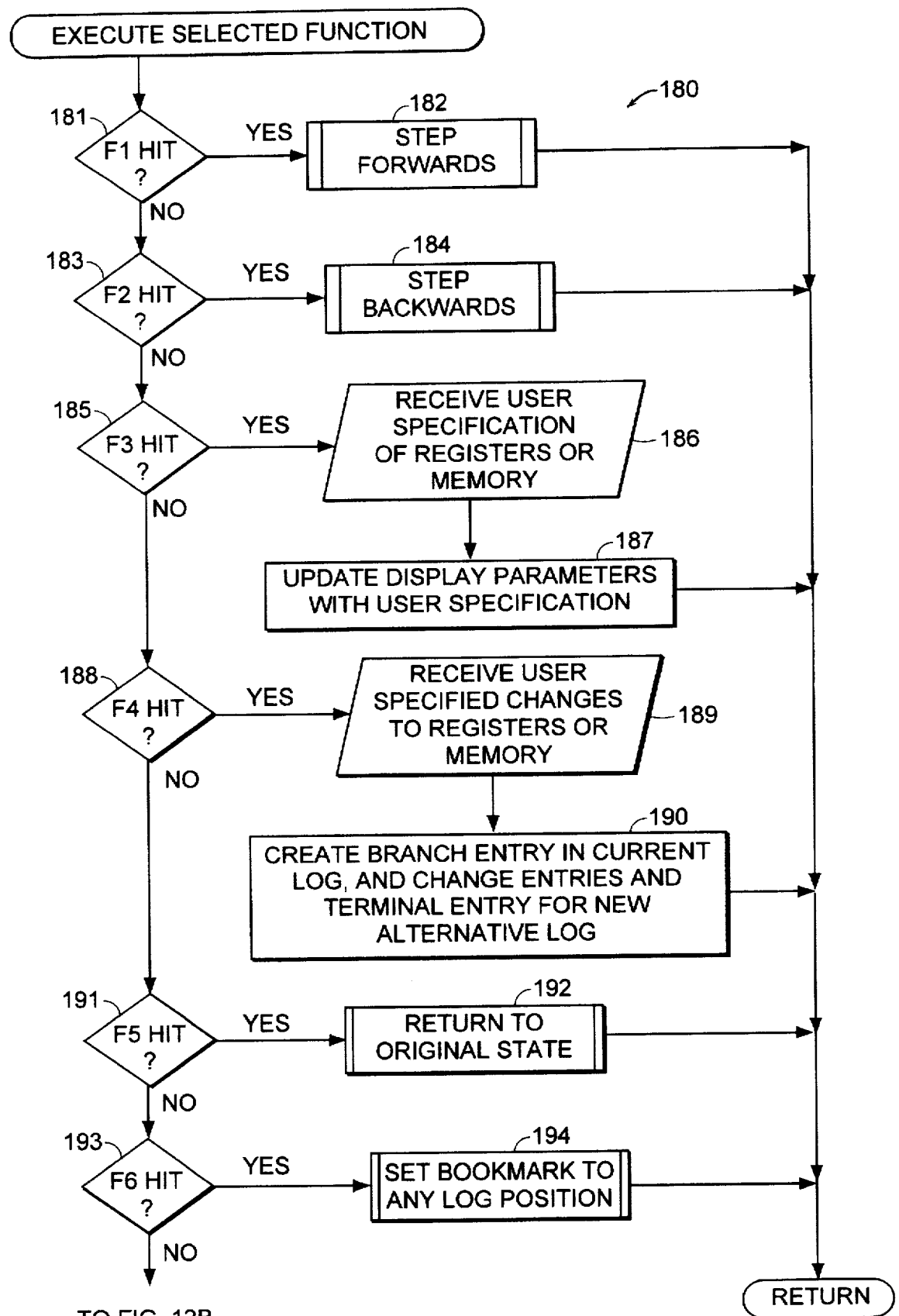
FIG. 12 is a flowchart of a subroutine called by the user interface routine of FIG. 11 in order to execute a user-selected function.
Figure 12B:
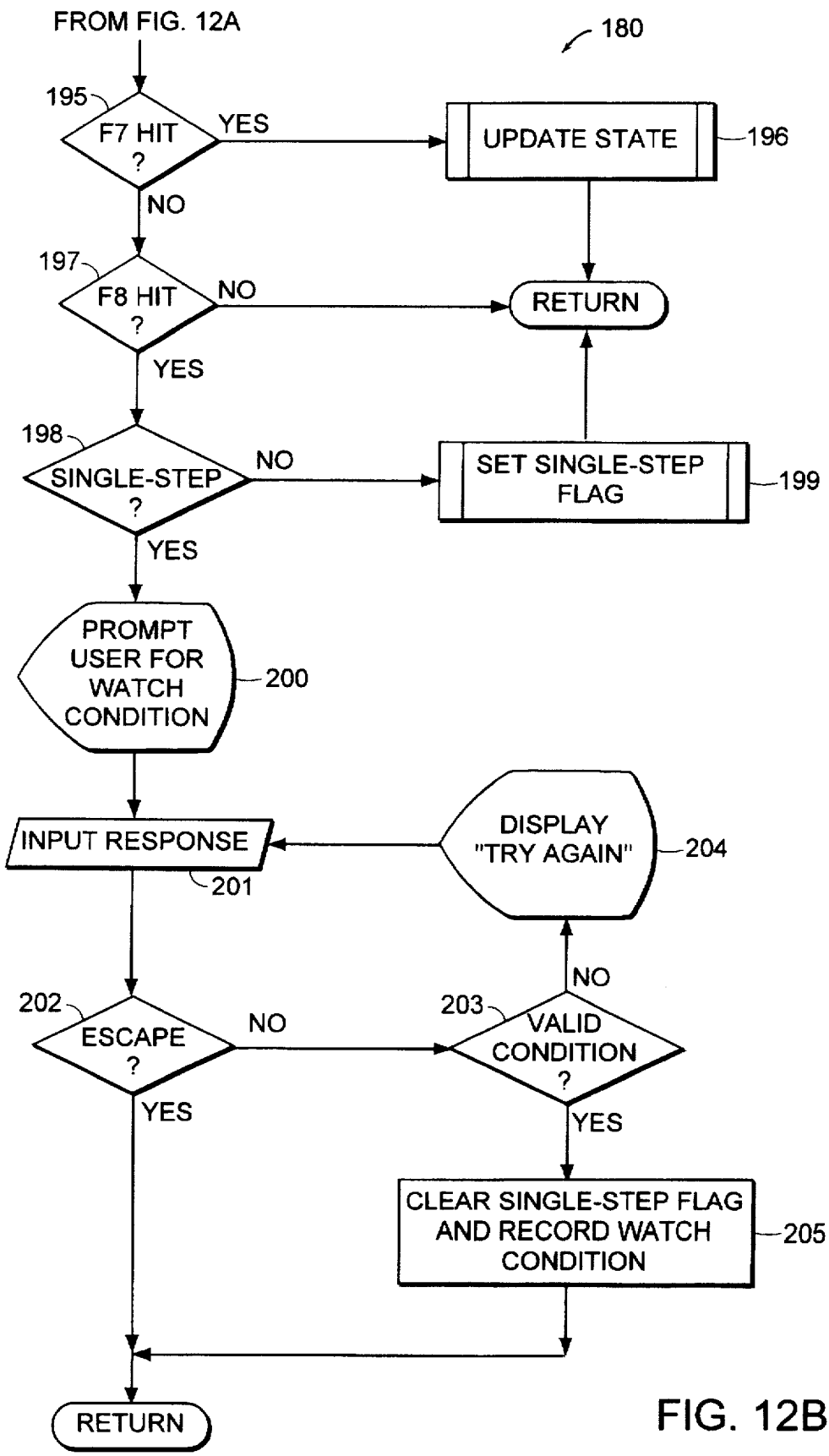

Turning now to FIG. 12, there is shown a flowchart generally designated 180 of a subroutine that performs the debug control function 92 of FIG. 4. When the user hits the "F1" function key, as tested in the first step 181, then a subroutine is called in step 182 to step forward through the application program, and execution returns. This subroutine is further described below in reference to FIG. 13. When the user hits the "F2" function key, as tested in step 183, in step 184, a subroutine is called to step backward through the application program, and execution returns to the user interface. This subroutine is further described below with reference to FIG. 18. When the user hits the "F3" function key, as tested in step 185, execution branches to step 186. In step 186, the data processor receives a user specification of registers or memory that the user would like to view in the summary (62 in FIG. 2) on the display (43 in FIG. 2). Then in step 187, the display parameters are updated with the user's specification, and execution returns to the user interface.

When the "F3" function key is not hit, execution continues from step 185 to step 188. Execution branches from step 188 to step 189 when the user hits the "F4" function key. In step 189, the data processor receives user-specified changes to registers or memory. Then in step 190, the data processor creates a branch entry in the current log, and creates change entries and a terminal entry for a new alternative log. Then execution returns to the user interface.

Figure 21:
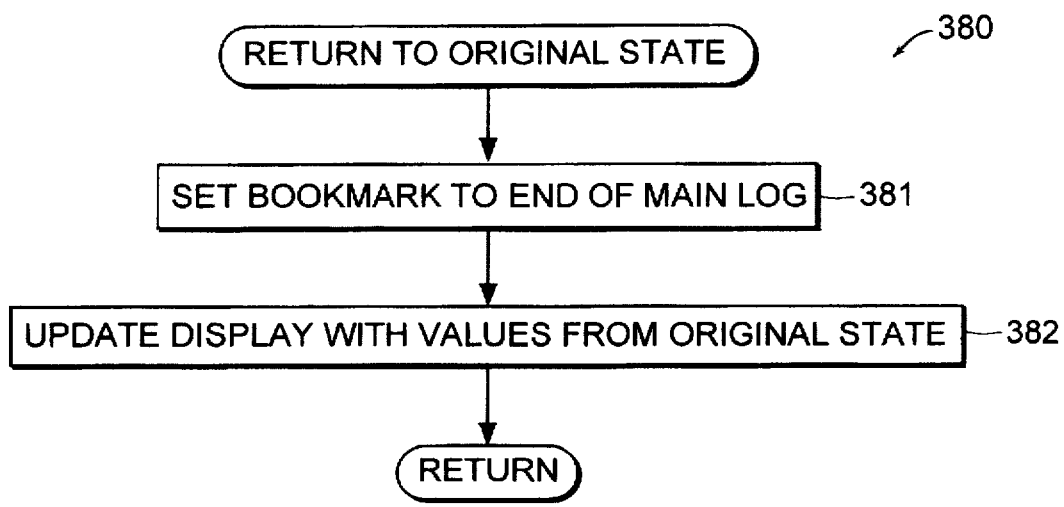
FIG. 21 is a flowchart of a subroutine for returning the focus of debugging to an original state of the digital computing system resulting from forward execution of the application program.

When the use does not hit the "F4" key, execution continues from step 188 to step 191. Execution branches from step 191 to step 192 when the "F5" key is hit. In step 192, a subroutine as further described below in FIG. 21, is called, to return to the original state for the application program, and then execution returns. Execution continues from step 191 to step 193 when the key "F5" is not hit.

When the "F6" key is hit, execution branches from step 193 to step 194. In step 194, the data processor calls a subroutine to set the bookmark to a previously-visited point, and then execution returns. This subroutine is further described below with reference to FIG. 22.

When the user hits the "F7" key execution branches from step 195 to step 196. In step 196, the data processor calls a subroutine to update the state for the computer program, and execution returns to the user interface. This subroutine is further described below with reference to FIG. 24.

In step 197, execution returns when the "F8" key is not hit. Otherwise, when the "F8" key is hit, execution branches in step 198 depending on whether the single-step flag is set. If the single-step flag is not set, execution branches to step 199, where the single-step flag is set, and execution returns. Otherwise, in step 200, the data processor prompts the user for a watch condition. The watch condition is received in step 201. In step 202, when the user hits the escape key, execution returns. Otherwise, in step 203, the data processor checks whether the response from the user is a valid Boolean condition of the state for the application program or the content of an instruction. If not, then in step 204, the user is told to try again, and execution loops back to step 201, to input a valid watch condition or an escape code. Otherwise, when the user enters a valid condition, the single-step flag is cleared and the watch condition is recorded in step 205, and execution returns to the user interface.

Figure 13:
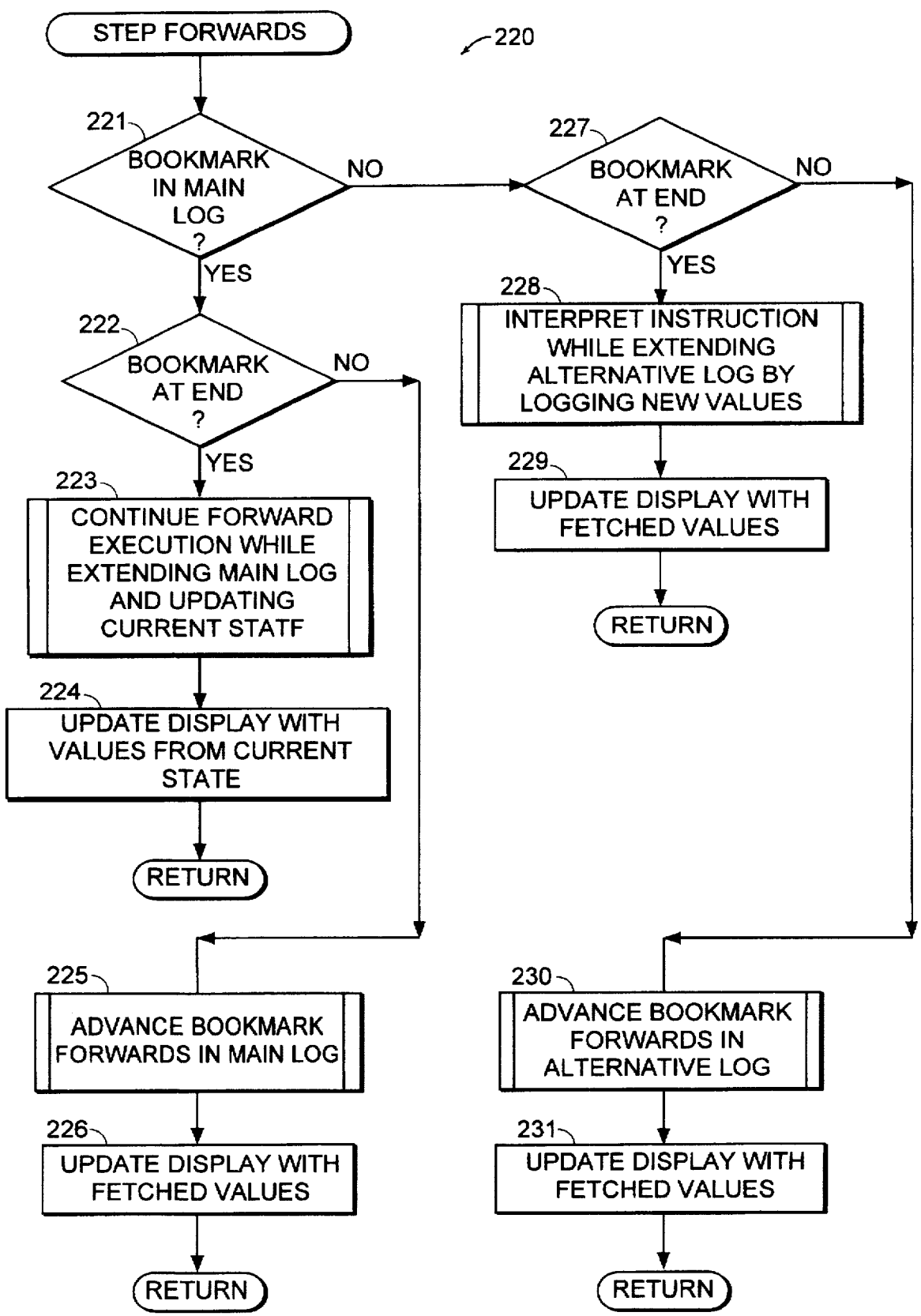
FIG. 13 is a flowchart of a subroutine for stepping forwards through an application program.

Turning now to FIG. 13, there is shown a flow chart generally designated 220 for stepping forward through the application program. In the first step 221, execution branches depending on whether the bookmark is in the main log. If so, then execution continues to step 222, where execution further branches depending on whether the bookmark at the end of the main log. When the bookmark is at the end of the main log, then execution continues in step 223. In step 223, forward execution is continued while extending the main log and updating the current state. In particular, the data processor calls a subroutine further described below with reference to FIG. 14. Then in step 224, the display is updated with values from the current state for the application program, and execution returns.

If in step 222 the data processor found that the bookmark was not at the end of the main log, then execution branches to step 225 to advance the bookmark forward in the main log. In step 225, the data processor calls a subroutine further described below with reference to FIG. 15. Then in step 226, the display is updated with fetched values. In step 226, the FETCH subroutine in FIG. 10 is called for each of the display parameters, and then execution returns.

If in step in 222 the data processor finds that the bookmark is not in the main log, then execution branches to step 227. In step 227, execution continues to step 228 when the bookmark is at the end of an alternative log. In step 228, the data processor calls a subroutine further described below with reference to FIG. 16 in order to decode application program instruction while extending the alternative log by logging new values resulting from the instructions. Then in step 229, the display is updated with fetched values of the display parameters, and execution returns. In step 229, the data processor calls the FETCH subroutine of FIG. 10.

Figure 17:
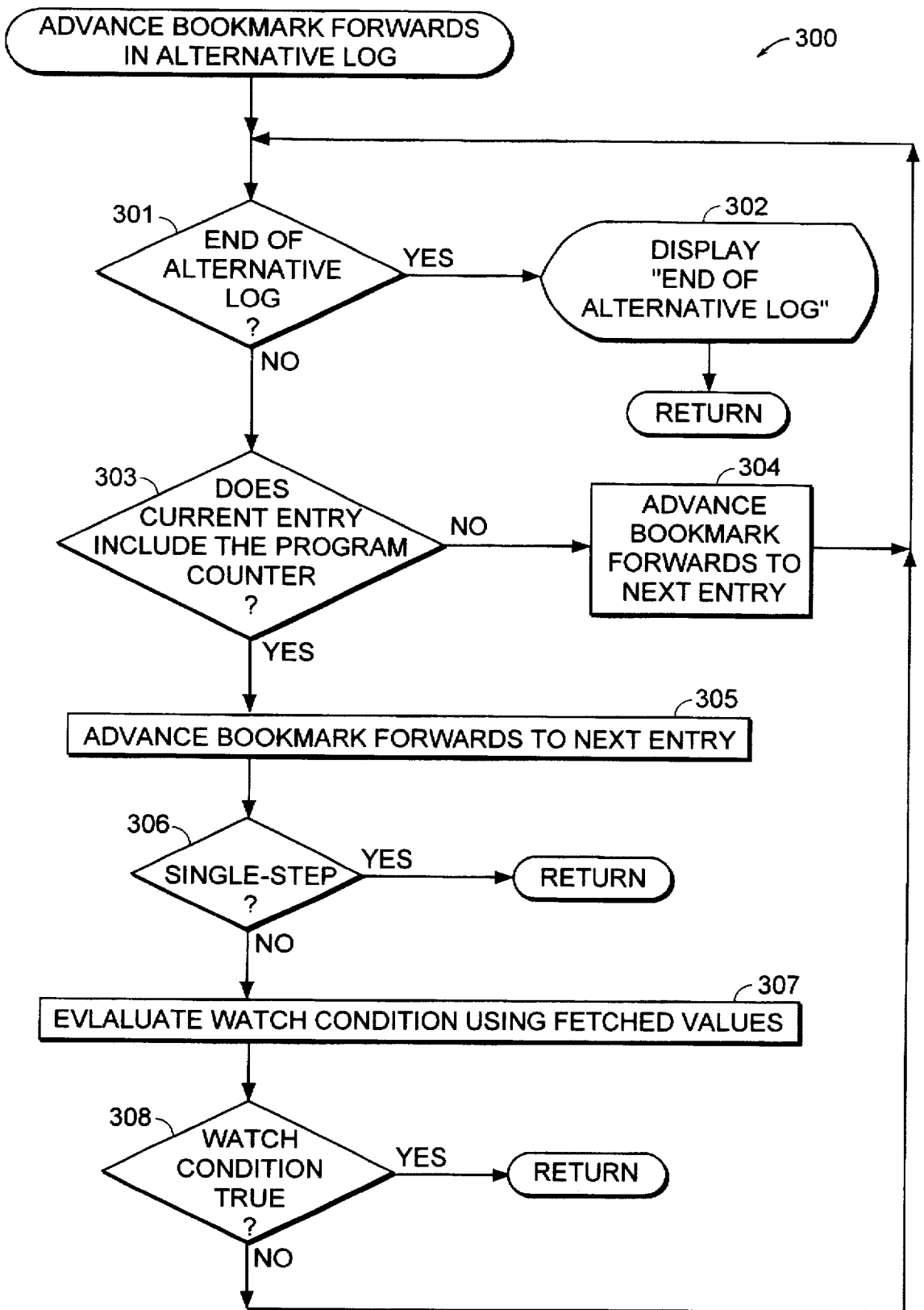
FIG. 17 is a flowchart of a subroutine for advancing the bookmark forwards in an alternative log.

If the data processor finds in step 227 that the bookmark is not at the end of the alternative log, then execution branches to step 230. In step 230, the data processor calls a subroutine as shown in FIG. 17 in order to advance the bookmark forward in the alternative log. Then in step 231, the display is updated with fetched values of the display parameters and execution returns. In step 231, the digital computer calls the FETCH subroutine of FIG. 10 for each of the display parameters.

Figure 14:
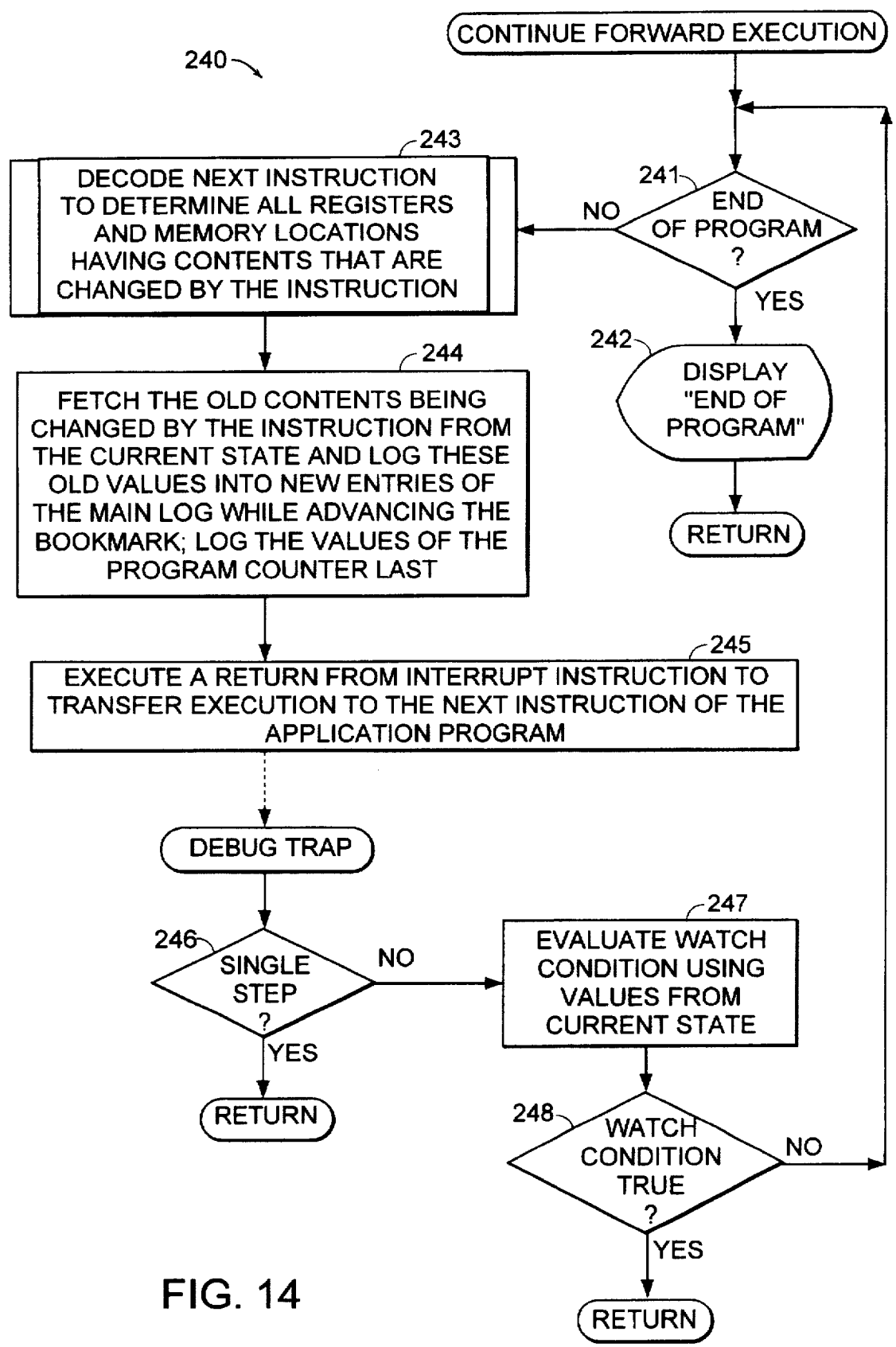
FIG. 14 is a flowchart of a subroutine for continuing forward execution in the application program.

Turning now to FIG. 14, there is shown a flowchart generally designated 240 of a subroutine for continuing forward execution. The subroutine is called in step 223 of FIG. 13. In a first step 241 of FIG. 14, the data processor checks whether the instruction pointer is at the end of the application program. If so, then forward execution cannot continue, so that in step 242 a message is displayed to the user to indicate that the end of the program has been reached, and execution returns.

If the data processor finds in step 241 that the end of the program has not been reached, then execution branches to step 243. In step 243, the data processor decodes the next instruction to determine all registers and memory locations having contents that are changed by the instruction. In step 243, the data processor calls an instruction decoding routine further described below with reference to FIG. 26. Then, in step 244, the data processor fetches the old contents being changed by the instruction from the current state for the application program, and logs the old values into new entries of the main log while advancing the bookmark. For each instruction, the old value of the program counter is logged last in order to consistently mark a boundary for the changes of each instruction. Then in step 245, the data processor executes a return from interrupt instruction to transfer execution to the next instruction of the application program. After execution of this next instruction, the data processor generates a debug trap which transfers execution back to the debugger program. In step 246, execution returns when the single-step flag is set. Otherwise, execution continues in step 247 where the data processor evaluates the watch condition. For each register or memory location having a value required for evaluation of the watch condition, a value is fetched from the current state for the application program. In step 248, execution returns when the watch condition is true, and otherwise execution loops back to step 241.

Figure 15:
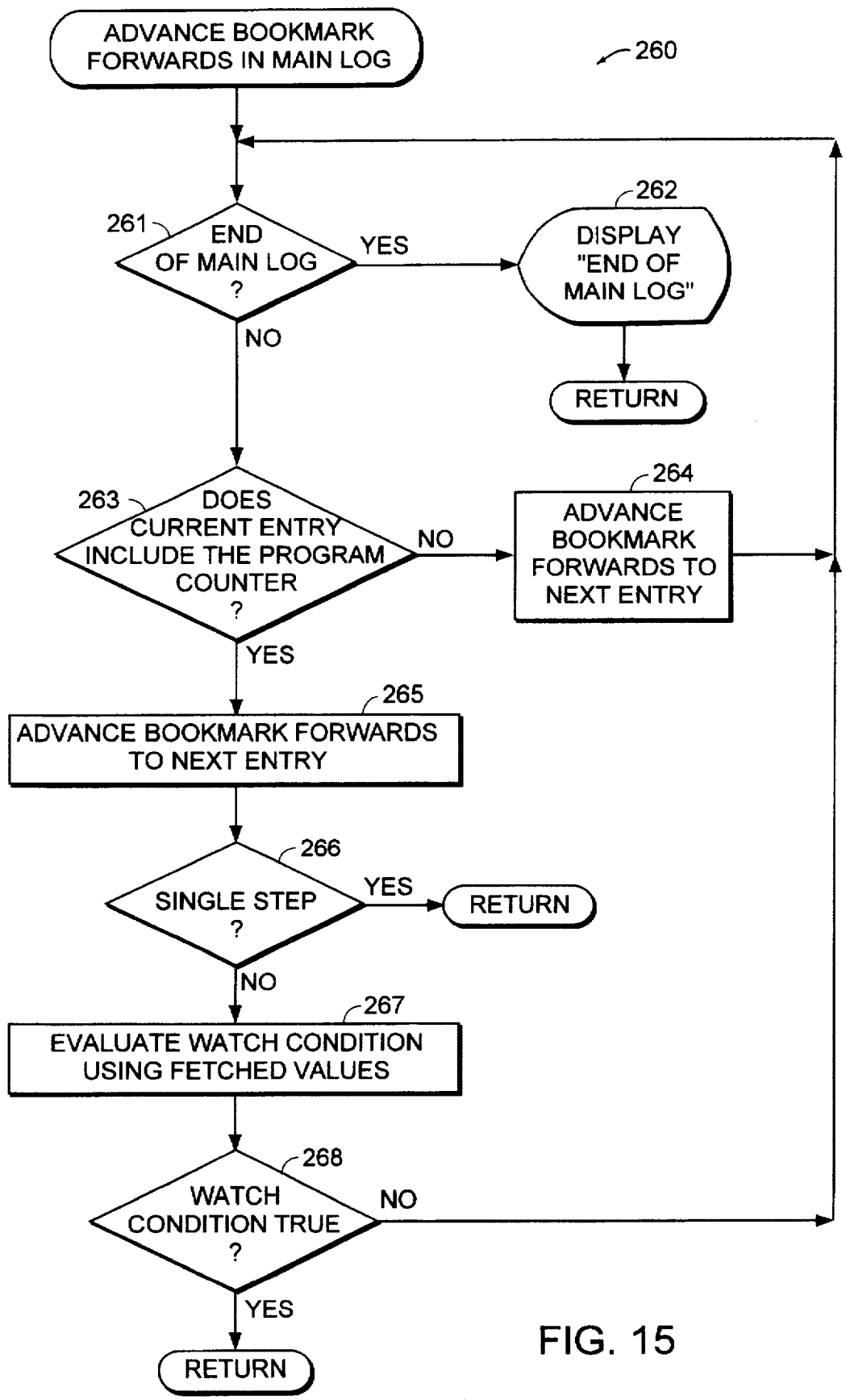
FIG. 15 is a flowchart of a subroutine for advancing a bookmark forwards in the main log.

Turning now to FIG. 15, there is shown a flowchart generally designated 260 of a subroutine for advancing the bookmark forward in the main log. The subroutine of FIG. 15 is called in step 230 of FIG. 13. In the first step 261 of FIG. 13, execution branches when the bookmark is at the end of the main log. When the bookmark is at the end of the main log, in step 268, the data processor displays a message to the user indicating that the end of the main log has been reached, and execution returns. (When the user hits the F1 key, forwards execution will continue. In an alternative construction, instead of displaying a message in step 262, forward execution could be continued in step 262 by calling the subroutine of FIG. 14.) Otherwise, in step 263, execution branches when the current entry does not include the program counter. When the current entry does not include the program counter, the book mark is not pointing to the last entry for instruction. Therefore, execution branches from step 263 to step 264 where the bookmark is advanced forward to the next entry, and execution loops back to step 261.

Eventually, the bookmark will be advanced to the last entry for an instruction. Then in step 265, the bookmark is advanced forward to the next entry so that it will point to an entry corresponding to a state resulting from complete execution of an instruction. In step 266, execution returns if the single-step flag is set. Otherwise, in step 267, the data processor evaluates the watch condition. The FETCH subroutine of FIG. 10 is called for each register or memory location having a value required for evaluation of the watch condition. In step 268, execution returns when the watch condition is true. Otherwise, execution loops to back to step 261 to continue advancing the bookmark forward in the main log.

Figure 16:
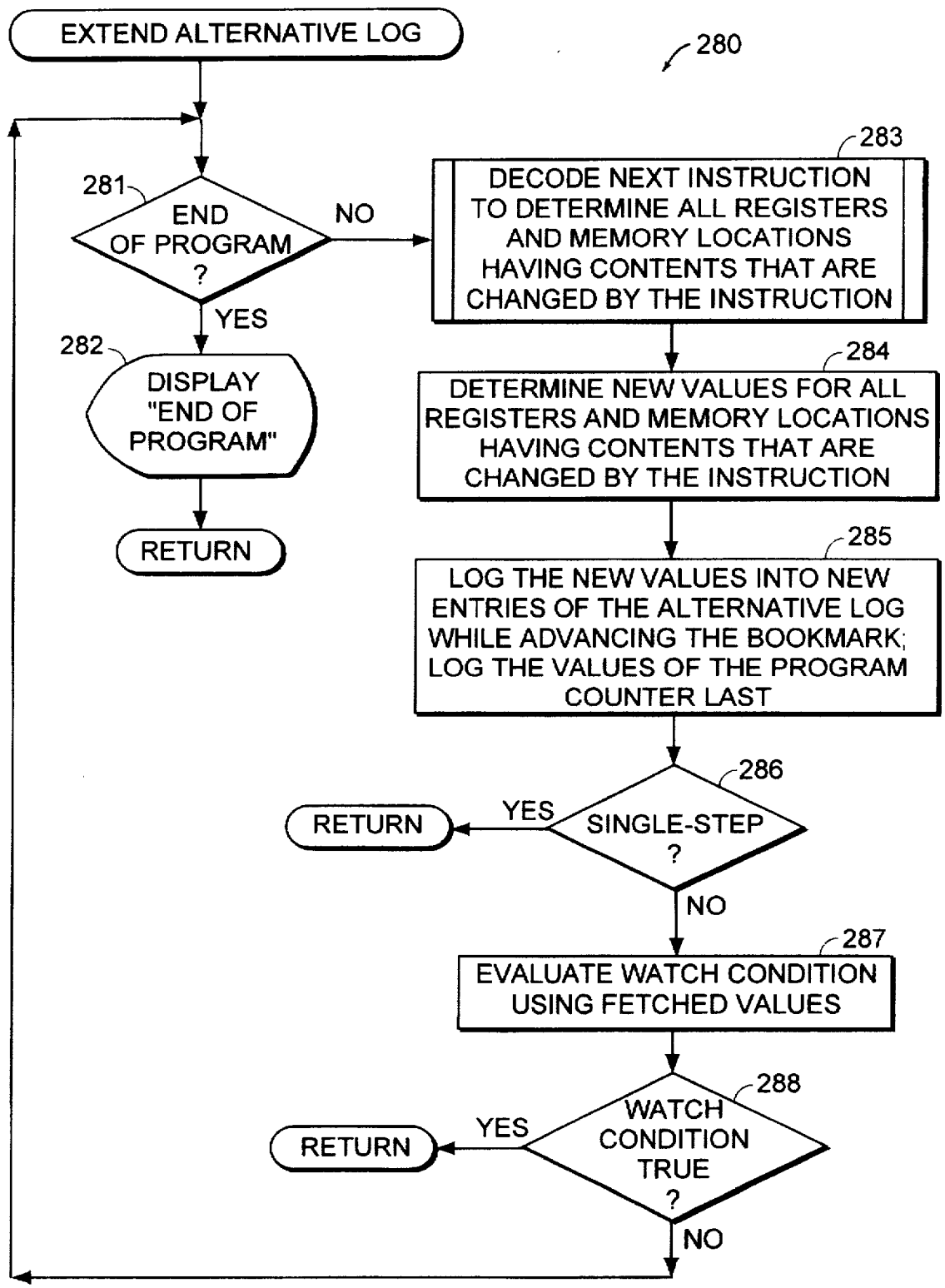
FIG. 16 is a flowchart of a subroutine for extending an alternative log by interpreting instructions in the application program.

Turning now to FIG. 16, there is shown a flowchart generally designated 280 of a subroutine for extending the alternative log pointed to by the bookmark. The subroutine of FIG. 16 is called in step 228 of FIG. 13. In the first step 281 of FIG. 16, execution branches depending on whether the end of the application program has been reached. When the end of the application program is reached, in step 282 the data processor displays a message to the user indicating that the end of the program has been reached, and execution returns. Otherwise, execution branches from step 281 to step 283. In step 283, the data processor decodes the next instruction to determine all registers and memory locations having contents that are changed by the instruction. The data processor calls an instruction decoding subroutine as further described below with reference for FIG. 26. In step 284, the data processor determines the new values for all of the registers and memory locations having values changed by the instruction. In this step, the data processor interprets the decoded instruction by performing a routine for the opcode of the instruction, as further described below with reference to FIG. 26. In step 285 of FIG. 16, the new values resulting from instruction interpretation in step 284 are logged into new entries of the alternative log while advancing the bookmark. By logging the changes specified by the instruction, the instruction is implicitly executed. For each instruction, the change in the program counter is logged last, in order to clearly mark the boundaries between the instructions. Next, in step 286, execution returns when the single-step flag is set. Otherwise, execution branches from step 286 to 287, where the data processor evaluates the watch condition. The data processor calls the FETCH subroutine of FIG. 10 for each register or memory location having a value required for evaluation of the watch condition. Finally, in step 288, execution returns when the watch condition is true. Otherwise, execution loops back to step 281.

Turning now the FIG. 17, there is shown a flowchart generally designated 300 for advancing the bookmark forward in an alternative log. The subroutine in FIG. 17 is called in step 230 of FIG. 13. In the first step 301 of FIG. 17, the data processor checks whether the bookmark is at the end of the alternative log. If so, then in step 302 the data processor displays a message to the user indicating that the end of the alternative log has been reached, and execution returns. Otherwise, execution continues from step 301 to step 303. In step 303, execution branches depending on whether the current entry includes the program counter. When the current entry does not include the program counter, execution branches to step 304 where the bookmark is advanced forward to the next entry. When the current entry includes the program counter, then execution continues from step 303 to step 305. In step 305, the bookmark is advanced forward to the next entry, so that the bookmark will be positioned at a location corresponding to the end of execution for an instruction. In step 306, execution returns when the single-step flag is set. Otherwise, in step 307, the data processor evaluates the watch condition. For each register or memory location having a value required for evaluation of the watch condition, the data processor calls the subroutine 140 of FIG. 10 to fetch a value. When the watch condition is true, execution returns. Otherwise, execution loops back to step 301.

Figure 18:
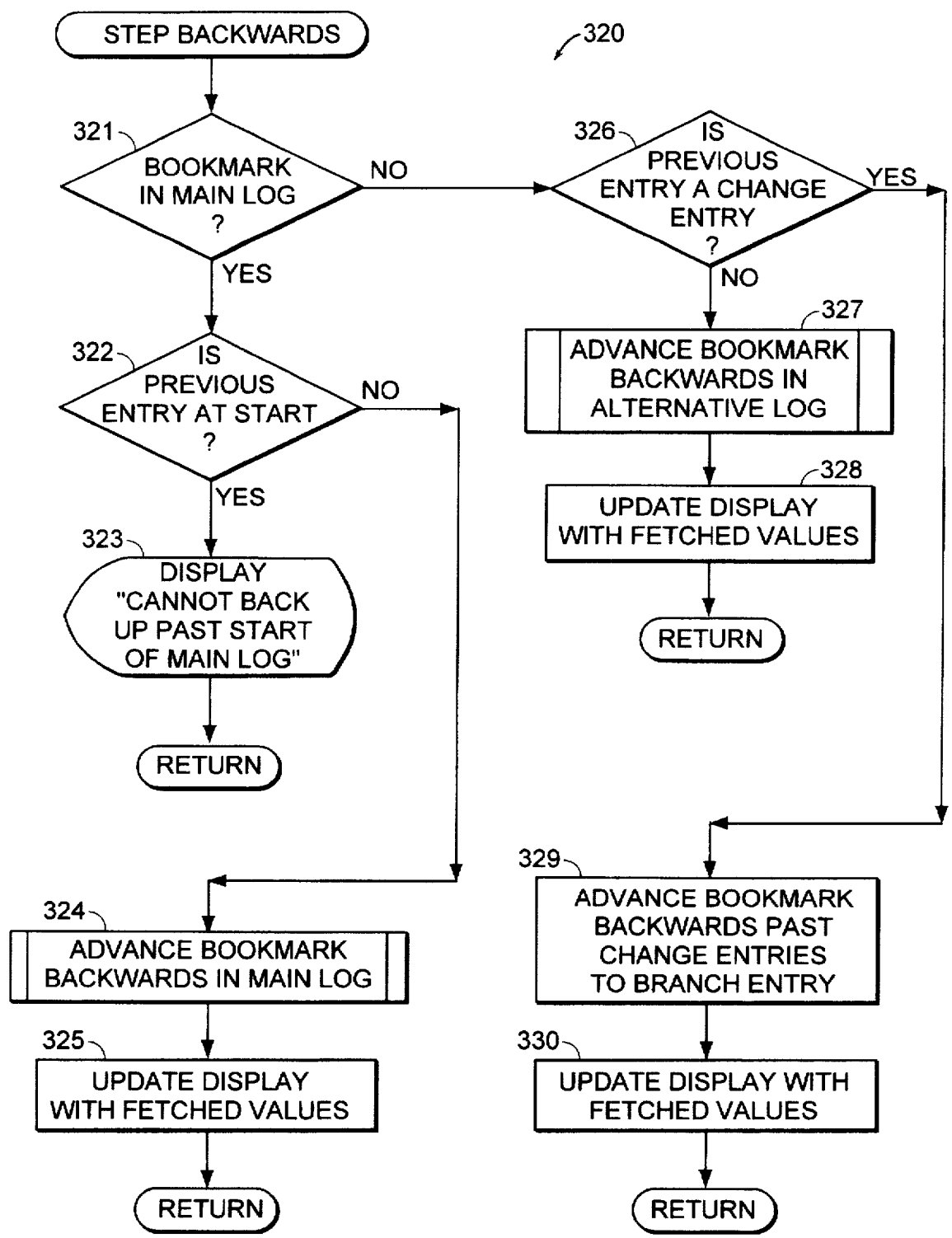
FIG. 18 is a flowchart of a subroutine for stepping backwards through the application program.
Figure 19:
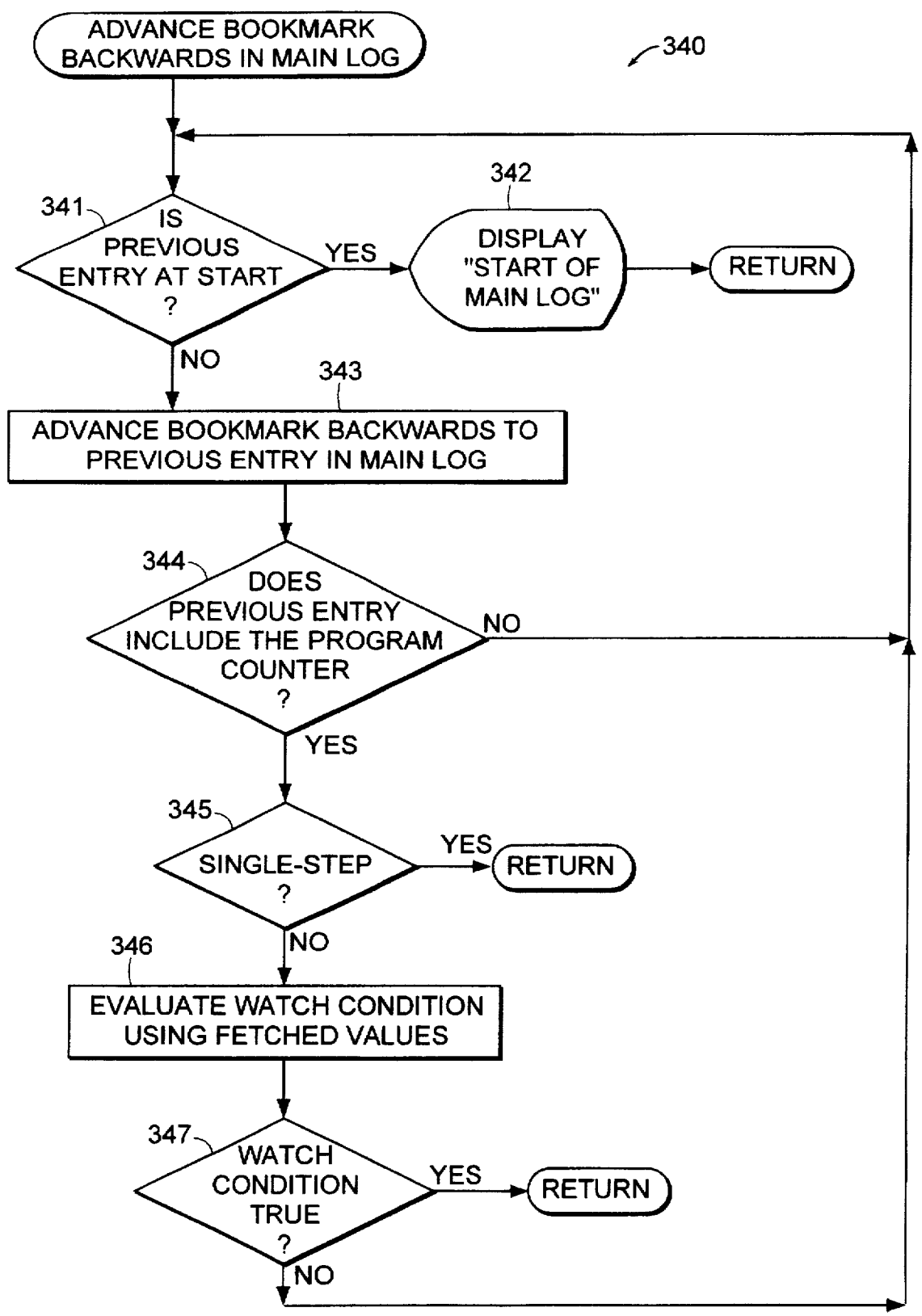
FIG. 19 is a flowchart of a subroutine for advancing the bookmark backwards in the main log.

Turning now to FIG. 18, there is shown a flowchart generally designated 320 of a subroutine for stepping backwards through the application program. In step 321, execution branches depending on whether the bookmark is in the main log. When the bookmark is in the main log, execution continues to step 322. Step 322, execution branches depending on whether the previous entry of the main log is at the start of the main log. (The previous entry is the entry pointed to, in the backward direction, by the entry pointed to by the bookmark.) If the previous entry is at the start of the main log, then in step 323 the data processor displays a message to the user indicating that it is not possible to backup past the start of the main log, and execution returns. If the previous entry is not at the start of the main log, then in step 324 a subroutine shown in FIG. 19 is called to advance the bookmark backwards in the main log. Then step 325, the display is updated with fetched values of the display parameters. The subroutine FETCH of FIG. 10 is called for each of the display parameters, and then execution returns.

Figure 20:
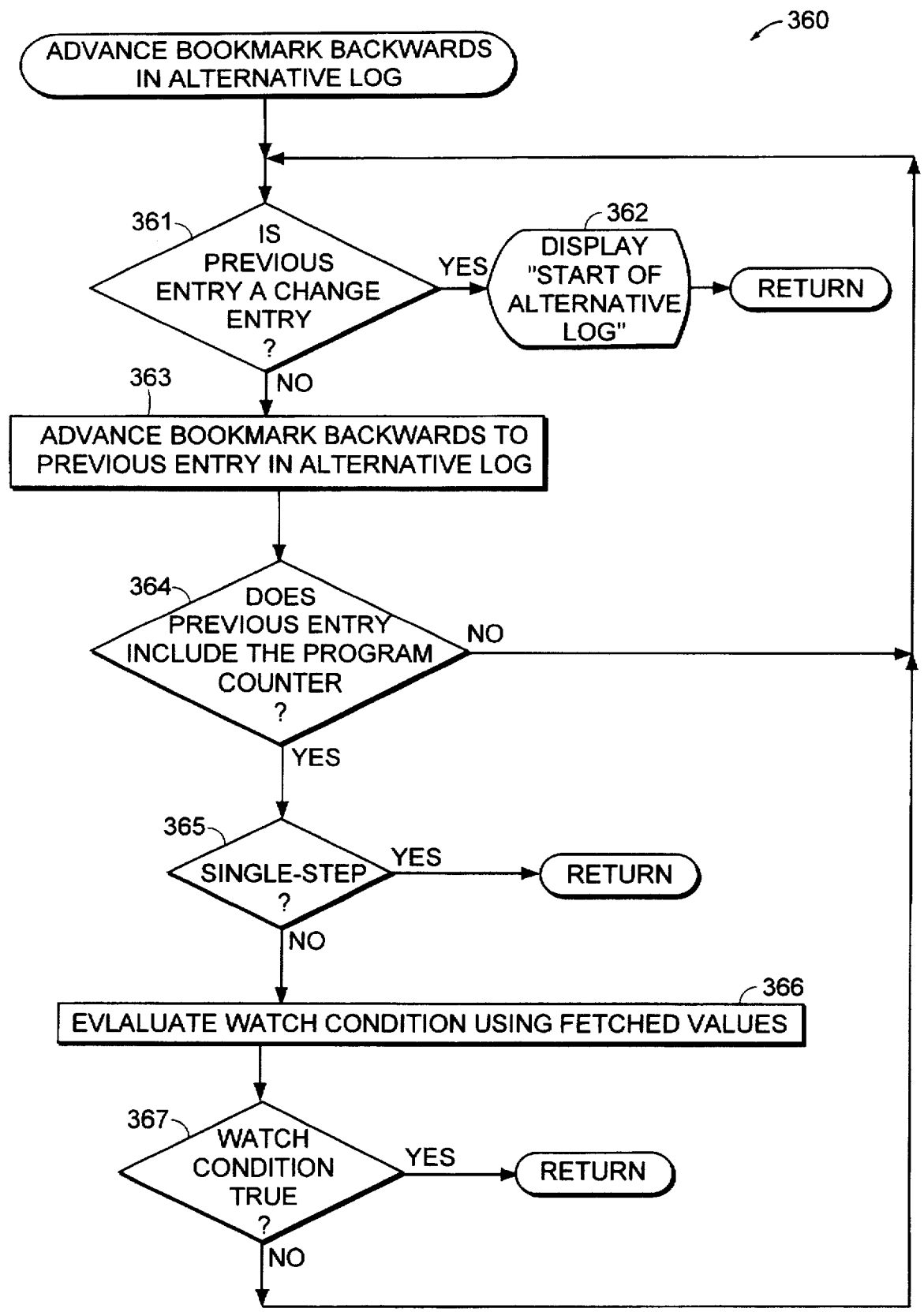
FIG. 20 is a flowchart of a subroutine for advancing the bookmark backwards in an alternative log.

If it is found in step 321 that the bookmark is not in the main log, then execution branches to step 326. In step 326, execution branches depending on whether the previous entry is a change entry. If not, then in step 327 the subroutine of FIG. 20 is called to advance the bookmark backwards in the alternative log. Then in step 328, the display is updated with fetched values for the display parameters. For each of the display parameters, the subroutine FETCH of FIG. 10 is called to determine a value. After the display is updated, execution returns.

If step 326 determines that the previous entry is a change entry, then in step 329 the bookmark is advanced backwards past all of the change entries until a branch entry is reached. This branch entry will be pointed to by the link pointer of the alternative log. Then in step 330, the display is updated with fetched values of the display parameters. The data processor calls the FETCH subroutine of FIG. 10 for each of the display parameters to determine a value. Then the display is updated, and execution returns.

Turning now to FIG. 19, there is shown a flow chart generally designated 340 that is called in step 324 of FIG. 18 for advancing the bookmark backwards in the main log. In the first step 341 of FIG. 19, execution branches when the previous entry is at the start of the main log. If the previous entry is at the start of the main log, then in step 342 a data processor displays a message to the user indicating that debugging has reached the start of the main log, and execution returns. Otherwise, execution continues to step 343, where the data processor advances the bookmark backward to the previous entry in the main log. Then in step 344, execution loops back to step 341 if the previous entry does not include the program counter. When the previous entry includes a program counter, then execution continues to step 345. In step 345, execution returns if the single-step flag is set. Otherwise, in step 346, the data processor evaluates the watch condition. For each register or memory location having a value required for evaluation of the watch condition, the data processor calls the FETCH subroutine of FIG. 10 to determine a value. In step 347, execution returns when the watch condition is true. Otherwise, execution loops back to step 341.

Turning now to FIG. 20, there is shown a subroutine generally designated 360 that is called in step 327 of FIG. 18 for advancing the bookmark backwards in the alternative log pointed to by the bookmark. In the first step 361, execution branches depending on whether the previous entry is a change entry. If the previous entry is a change entry, then in step 362 the data processor displays a message to the user indicating that debugging has reached the start of the alternative log, and execution returns. (When the user hits the F2 key, backwards execution will continue into the "parent" log from which the alternative log branches. In an alternative construction, in step 362, execution could jump to step 329 of FIG. 19 in order to immediately continue backwards in the "parent" log.) Otherwise, in step 363, the data processor advances the bookmark backwards to the previous entry in the alternative log. In step 364, execution branches depending on whether the previous entry includes the program counter. If the previous entry does not include the program counter, then execution loops back to step 361. Otherwise, the bookmark is at a position corresponding to an instruction boundary. Then step 365, execution returns when the single-step flag is set. Otherwise, in step 366, the data processor evaluates the watch condition using fetched values. For each register and memory location in the watch condition, the data processor calls the FETCH routine of FIG. 10 to fetch a value. In step 367, execution returns when the watch condition is true. Otherwise, execution loops back to step 361.

Turning now to FIG. 21, there is shown a flowchart generally designated 380 that is called in step 192 of FIG. 12 to return debugging to the original state for the computer program. In the first step 381 of FIG. 21, the bookmark is set to the end of the main log. Then in step 382, the display is updated with values fetched from the original state that was generated by execution of the application program. Then execution returns.

Figure 22:
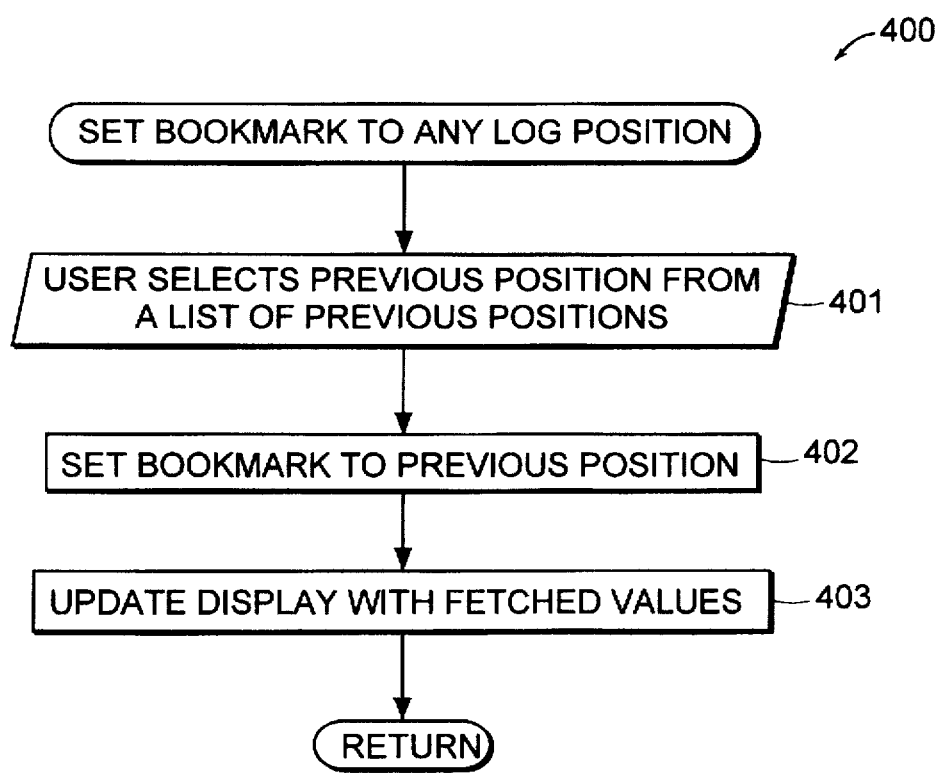
FIG. 22 is a flowchart of a subroutine for returning the focus of debugging to any position in the main log or any alternative log.

Turning now to FIG. 22, there is shown a flowchart generally designated 400 of the subroutine that was called in step 194 of FIG. 12 for setting the bookmark to any position in the main log or any alternative log. In the first step 401 of FIG. 22, the user selects a previous log position from a list of previous positions. For example, the terminal dummy entries of the alternative logs can be linked together in a linked list such that the terminal entry for each new log is placed at the end of the list. Therefore, in step 401, the user may browse through the list and select any terminal entry in the list. Alternatively, the subroutine of FIG. 12 could recognize a function key such as "F9" for storing the then-present log position in a list that would later be displayed to the user in step 401. Another alternative would be to display a graphical representation of the main log and the alternative log, and permit the user to use a mouse, light-pen, or other pointing device, to select a position on the graph. A simplified graph could be displayed, for example, that would include the start of the main log, the end of the main log, the branch points, and the first value entries in each of the alternative logs.

In any event, the purpose of step 401 is to provide the data processor with an address that is guaranteed to point to an entry in the main log or an alternative log. Therefore, in step 402, the bookmark can be set to point to an entry in the main log or an alternative log. In the final step 403, the data processor updates the display with fetched values for the display parameters. For each display parameter, the data processor calls the FETCH routine of FIG. 10. After updating the display, execution returns.

Figure 23:
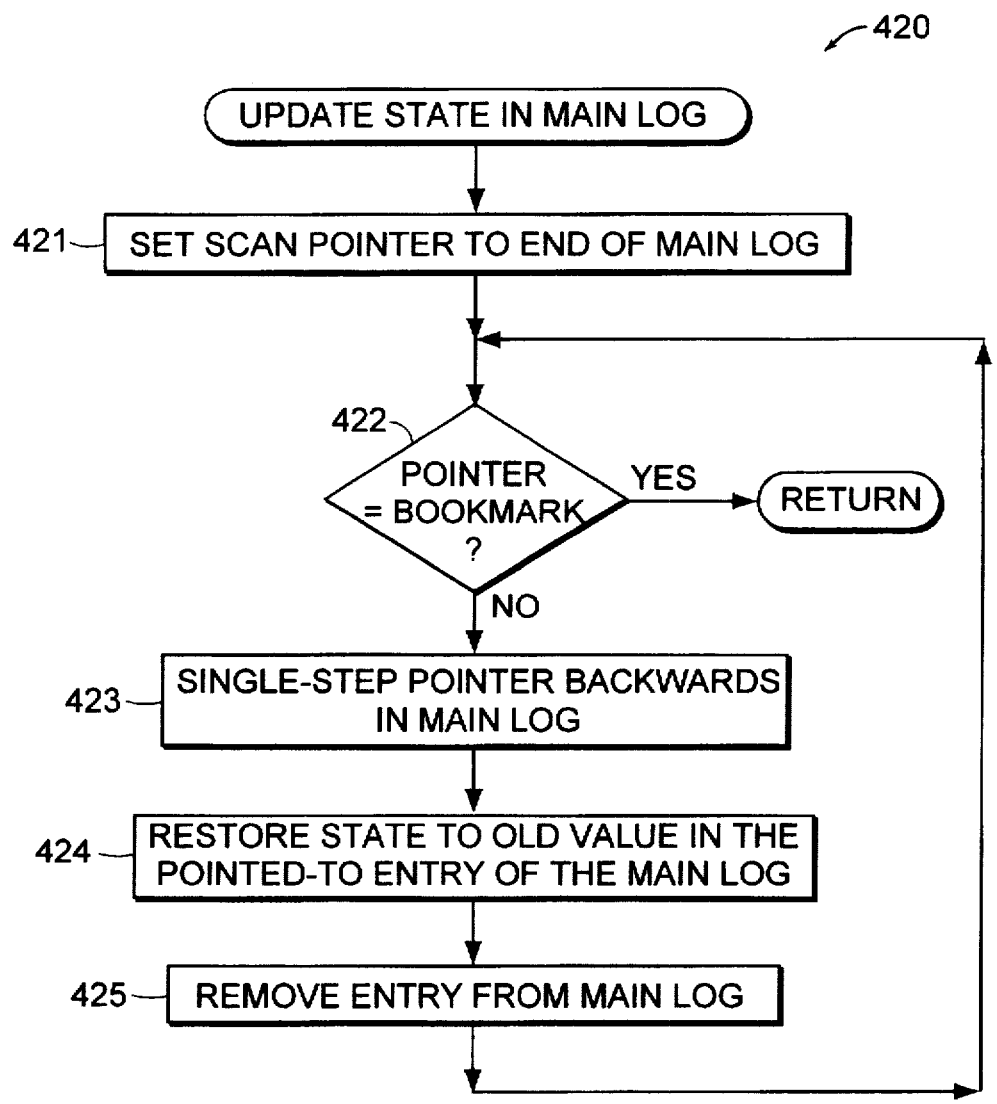
FIG. 23 is a flowchart of a subroutine for updating the state of the digital computer to a previous state that existed during logging of a specified entry in the main log.

Turning now to FIG. 23, there is shown a flowchart of a subroutine generally designated 420 for updating the state to a previous state corresponding to an entry in the main log. The state for the computer program is updated to the state that had previously existed at the time corresponding to the entry in the main log pointed to by the bookmark. The state is updated by rolling back or undoing the changes made to the state by instructions corresponding to entries in the main log following the bookmark. In a first step 421, a scan pointer is set to the end of the main log. In the next step 422, execution returns when the scan pointer is equal to the bookmark. Otherwise, in step 423, the pointer is single-stepped backwards in the main log to a previous entry. Then in step 424, the state is restored to the old value in the pointed-to entry of the main log. In other words, the value for a memory location or register in the pointed-to entry is written into the state for the application program. In particular, the value is copied from the entry of the main log into the memory allocated to the application program or into a location on the stack corresponding to a register used by the application program. Finally, in step 425, the pointed-to entry is removed from the main log, and execution loops back to step 422. It should be apparent that by updating the state to a previous position in the main log, the main log has been pruned, thereby freeing up memory space. This is useful to conserve memory space and to speed up execution time when the programmer desires to branch off from the bookmark in the main log and does not presently intend to return to a location in the sequence of program execution corresponding to the removed entries of the main log. Execution time is saved because the FETCH subroutine of FIG. 10 does not need to search backward through the removed entries of the main log.

Figure 24:
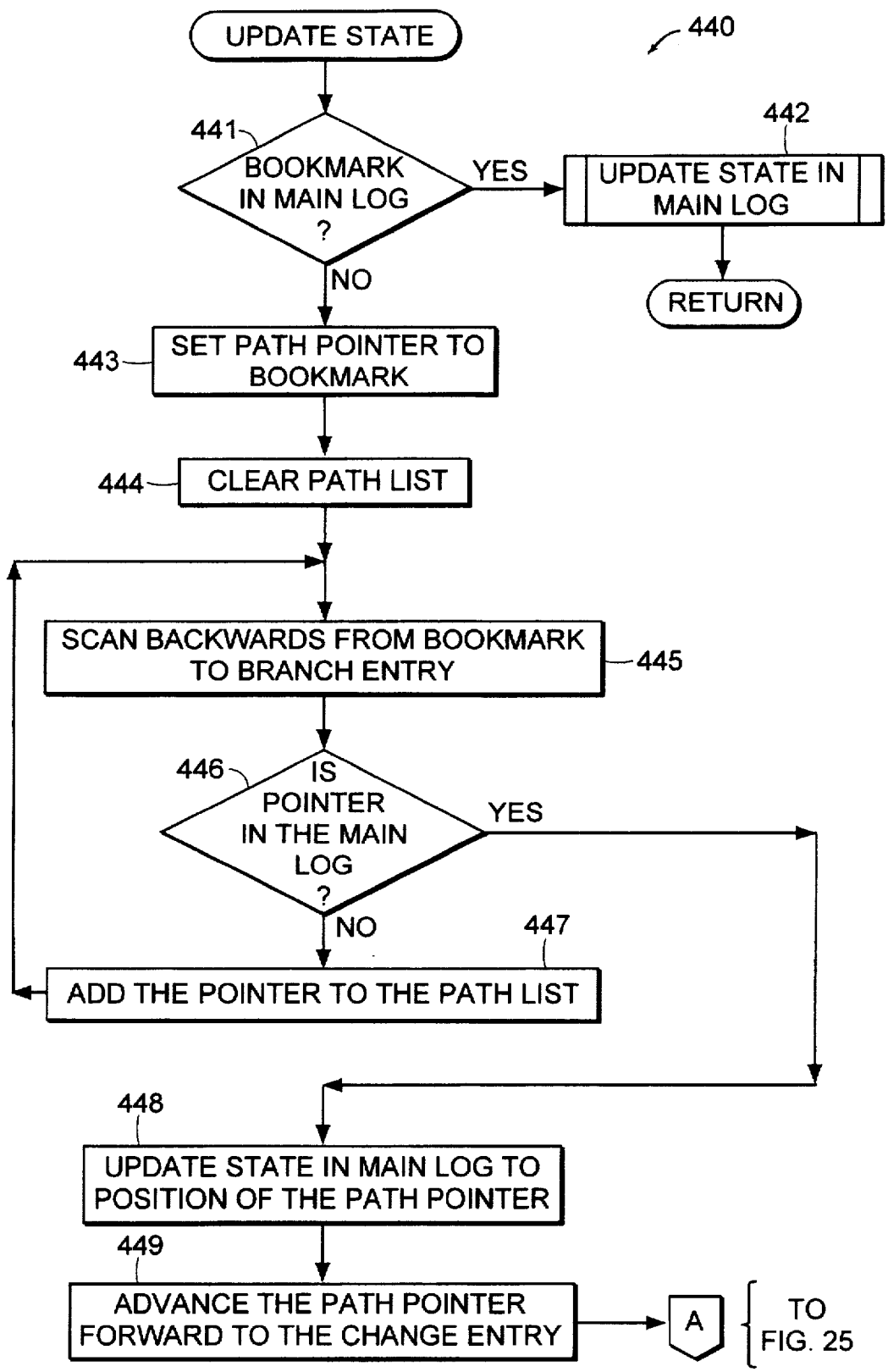
FIGS. 24 and 25 together comprise a flowchart of a subroutine for updating the state of the digital computing system to a state corresponding to a specified entry in the main log or any alternative log.

Turning now to FIG. 24, there is shown a flowchart generally designated 440 of the subroutine called in step 195 of FIG. 12 for updating the state for the application program to the state that either existed in the main log or that would have existed if execution had branched from the main log and taken a path along one or more alternative logs to the log entry pointed to by the bookmark. The subroutine of FIG. 24 prunes the logs by converting the main log so that the main log includes only entries from the portion of the alternative log before the bookmark and removing all other entries from all other logs except any alternative logs extending from the portion of the alternative log before the bookmark. For example, with reference to FIG. 8, if the state were updated when the bookmark was pointing to entry 124 in FIG. 8, then the main log would be converted so that the main log would consist of the start entry 111, followed by the entry 122, followed by the entry 123, and terminated by the entry 112. Considering another example, with reference to FIG. 9, if the state were updated when the bookmark was pointing to entry 123 in FIG. 9, then the main log would be converted so that the main log would consist of the start entry 111, followed by the entry 122, followed by the branch entry 132, followed by the terminal entry 112, and in this example, the alternative log 131 would remain and would become connected to the main log via the branch entry 132.

In a first step 441 of FIG. 24, execution branches to step 442 when the bookmark is in the main log. In step 442, the data processor calls the subroutine of FIG. 23 to update the state to the bookmark in the main log, and execution returns. When the bookmark is not in the main log, then it is necessary to first determine the path from the bookmark to the main log. For determining this path, in step 443, a path-pointer is set to the bookmark, and then in step 444, a path list is cleared. This path list will be used as a first-in, last-out (FILO) buffer or stack, as entries are added to and removed from the path list. Next, in step 445, the data processor scans backwards from the bookmark until a branch entry is reached. In step 446, execution branches depending on whether the path-pointer points to an entry in the main log. If the path-pointer does not point to an entry in the main log, then in step 447, the path-pointer is added to the path list, and execution branches back to step 445. Eventually, the path-pointer will be found in step 446 to point to the main log. Then execution branches to step 448 to update the state in the main log to the state that had previously existed at the time corresponding to the entry of the main log pointed to by the path-pointer. In other words, a subroutine similar to the subroutine of FIG. 23 is called, except that in step 422 of FIG. 23, the scan-pointer is compared to the path-pointer instead of the bookmark. Then in step 449 of FIG. 24, the path-pointer is advanced forward to the change entry that is linked to the branch entry.

Figure 25:
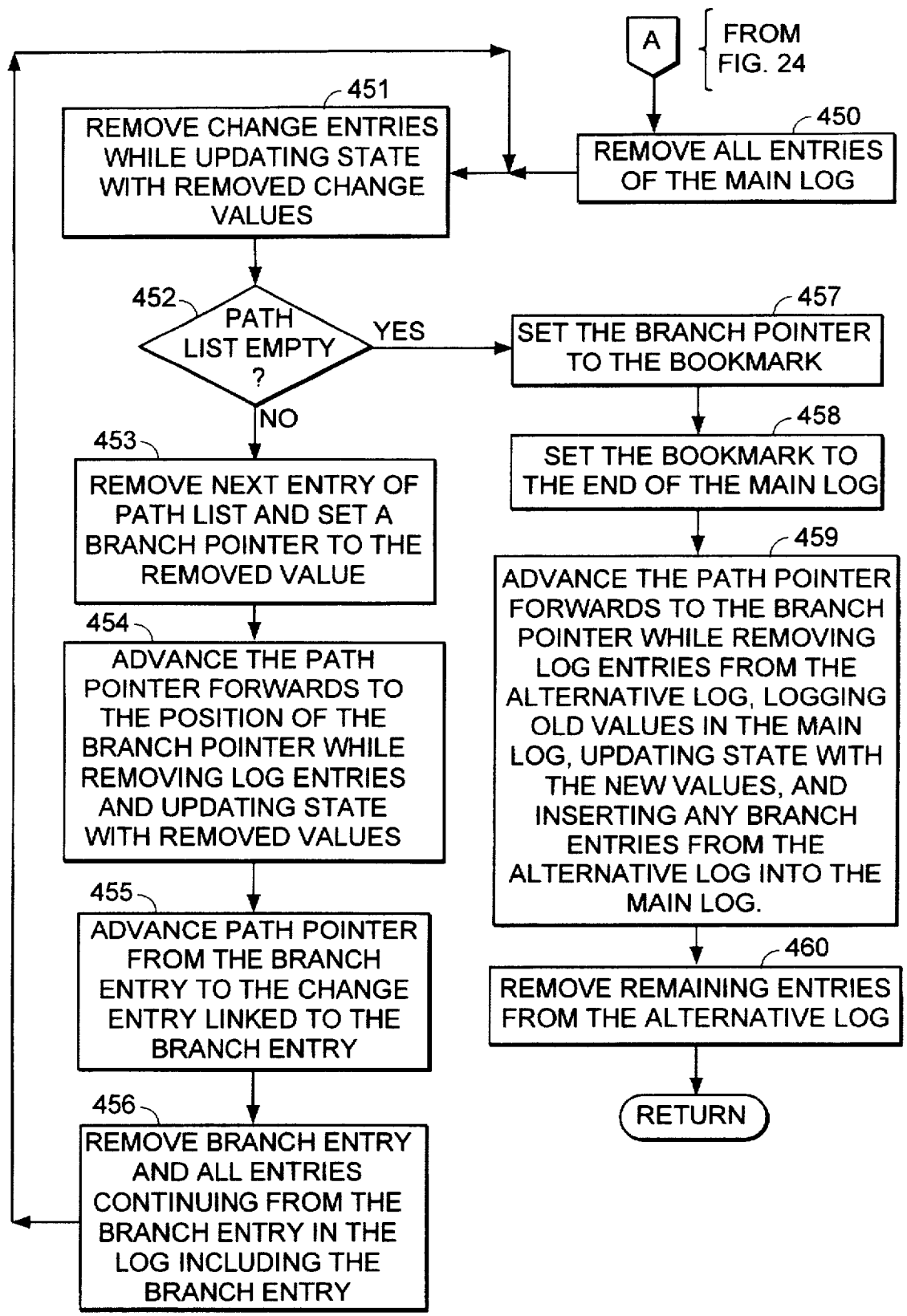

Continuing in step 450 of FIG. 25, all remaining entries of the main log are removed, except the initial dummy entry and the terminal dummy entry of the main log are not removed. Then in step 451, the change entries are removed while updating the state with the removed change values while advancing the path-pointer forward until the path-pointer no longer points to a change entry. As introduced above with respect to FIG. 8, a change value of a change entry (121 in FIG. 8) is a new value that was specified by the user. The state is updated with the removed change values by writing the change values into the state for the application program. Then in step 452, execution branches depending on whether the path list is empty. If the path list is not empty, then execution continues in step 453. In step 453, the next entry of the path list is removed and a branch pointer is set to the removed value. Then in step 454, the data processor advances the path-pointer forwards to the position of the branch pointer while removing log entries and updating the state with the removed values. In other words, the removed values are written into the state for the application program. Next, in step 455, the path-pointer is advanced from the branch entry to the change entry that is linked to the branch entry. Then in step 456, the data processor removes the branch entry and also removes all entries continuing from the branch entry in the log including the branch entry, and then execution loops back to step 451.

When step 452 finds that the path list is empty, then execution branches to step 457. In step 457, the data processor sets the branch pointer to the value of the bookmark. Then in step 458, the bookmark is set to point to the end of the main log. Next, in step 459, the path-pointer is advanced forwards to the branch pointer while removing log entries from the alternative log, logging corresponding old values in the main log, and updating the state for the application program with the new value, and inserting any branch entries from the alternative log into the main log. In other words, in step 459, entries of the alternative log are converted to corresponding entries inserted into the main log. Finally, in step 460, the data processor removes the remaining entries from the alternative log, including the entry at the very end of the alternative log.

Figure 26:
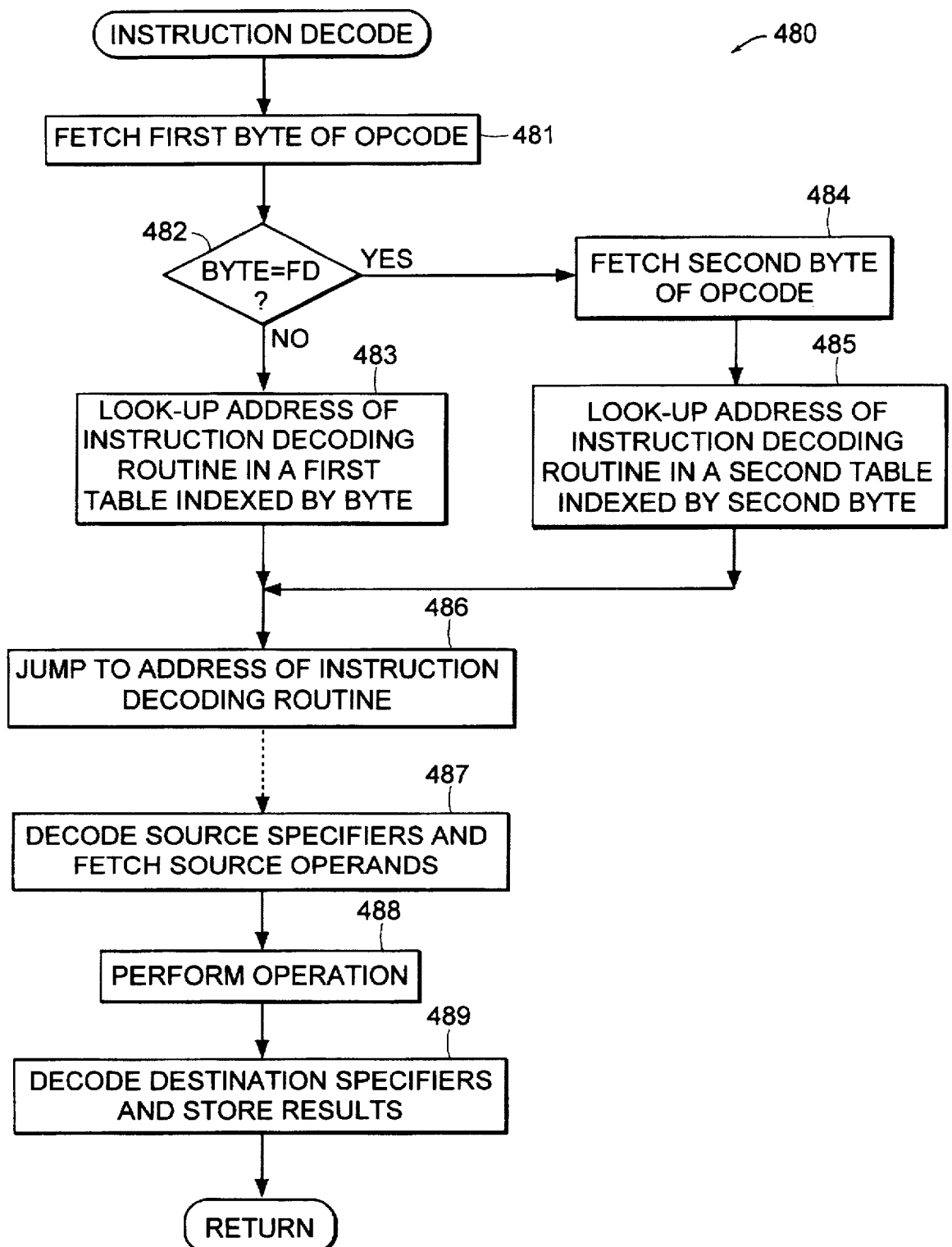
FIG. 26 is a flowchart of an instruction decoding subroutine.

Turning now to FIG. 26, there is shown a flowchart generally designated 480 of a subroutine for decoding a machine-language "VAX" (trademark) instruction of the kind found in the assembly language listing 61 of FIG. 2. In the first step 481 of FIG. 26, the data processing unit fetches a first byte of the instruction opcode. The instruction opcodes and their characteristics for the "VAX" (trademark) instruction set are listed in Appendix A of Henry M. Levy and Richard H. Eckhouse, Jr., *Computer Programming and Architecture, VAX*-11, Digital Equipment Corporation, Maynard, Mass. (1980), pp. 371–383, incorporated by reference herein. Further details regarding the decoding of "VAX" (trademark) instructions are disclosed in Fite et al., "Method and Apparatus for Simultaneously Decoding Three Operands in a Variable Length Instruction When One of the Operands is Also of Variable Length," U.S. Pat. No. 5,148,528 issued Sep. 15, 1992, incorporated herein by reference. The opcodes have either one or two bytes. When an opcode has two bytes, the first byte has a value of "FD" hexadecimal. In the next step 482, execution branches depending on whether the first byte of the opcode has a value of "FD" hexadecimal. If not, then a first table is indexed by the byte in order to look-up an address of an instruction decoding routine corresponding to the opcode. If the first byte has a value of "FD" hexadecimal, then execution branches from step 482 to step 484 where the data processor fetches the second byte of the opcode. Then in step 485, a second table is indexed by the second byte in order to look-up the address of an instruction decoding routine corresponding to the opcode.

After either step 483 or 485, in step 486, execution jumps to the address of the instruction decoding routine. Although the instruction decoding routine for each instruction will be different depending upon the precise definition of the instruction, a majority of the instructions will have at least one source specifier and at least one destination specifier that follow the instruction opcode in the machine language version of the application program (77 in FIG. 3). Therefore, as shown in FIG. 26, execution jumps from step 486 to step 487, where the data processor decodes the source specifiers for the instruction and fetches the source operands. Finally, in step 488, the data processor decodes the destination specifiers, and execution returns.

When normally used for interpreting instructions, the data processor further processes the results of the decode routine by performing the operation specified by the opcode upon the source operands, and storing the results in the registers and memory that comprise the state for the application program. For the present invention, the data processor also performs the operation specified by the opcode. This is done in step 284 of FIG. 16. But, in step 285 of FIG. 6, the results are stored in an alternative log during forward interpretation, instead of in the registers and memory allocated to the application program. Moreover, during forward execution in step 243 of FIG. 14, the instruction decoder is used to identify the particular registers and memory locations where the results are stored, so that the old values can be fetched and stored in entries of the main log before the state is updated. Although the state could be updated without actually executing the instruction, the quickest way to update the state usually is to execute the instruction. This assumes that the data processor can execute the machine-language instructions, which is the usual case. However, it is not necessary for the data processor 41 to be able to execute the machine language instructions of the application program, because the instruction decoding routine of FIG. 26 need not be written in the machine language that it decodes. In this case, the instruction decoding routine is used to interpret or simulate the instructions during forward execution, and in step 489, one or more machine language instructions recognized by the data processor are used to store the results of the instruction being interpreted into the state for the application program.

Figure 27:
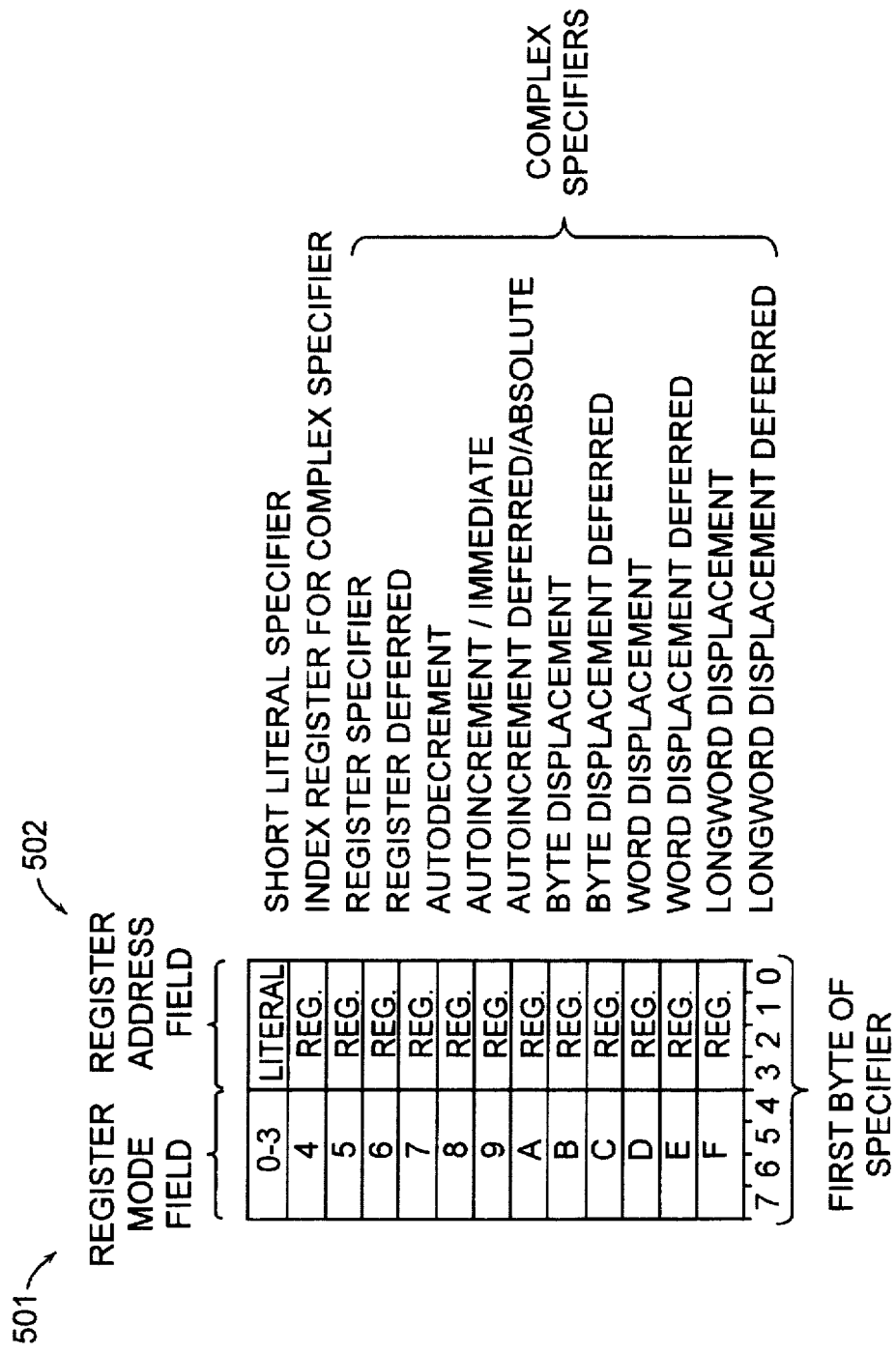
FIG. 27 is a table illustrating various specifier modes indicated by the first byte of a variable-length specifier.

The "VAX" (trademark) instruction set includes so-called variable-length instructions. Such variable-length instructions may use specifiers having various lengths depending upon an addressing mode of the specifier. The addressing modes are shown in FIG. 27. As further shown in FIG. 27, the first byte of each specifier has a four-bit register mode field 501 and a four-bit register address field 502. The numerical value of the register mode field indicates the addressing mode of the specifier. If the two most significant bits of the first byte of the operand specifier are both zero, then the operand specifier consists of the single first byte, and the six least significant bits of this byte are interpreted or decoded as specifying a six-bit value referred to as a "short literal."

If the first two most significant bits of the first byte of an operand specifier are not zero, and assuming that the byte is not part of a branch displacement, then the byte is decoded as a particular one of twelve possible register addressing modes relating to a specified one of sixteen general purpose registers R0 to R15 in the CPU. The most significant four bits of the byte (constituting a register mode field) are decoded to indicate the addressing mode, and the four least significant bits (constituting a general purpose register address field) are used to address a particular one of the sixteen general purpose registers.

If the register mode field has a hexadecimal value of four, then an "index mode" is specified in which the value of the content of the general purpose register addressed by the register address field is multiplied by the size in bytes of the operand (e.g., by 1, 2, 4, 8 or 16 for respective byte, word, longword, quadword or octaword data types) and the sum is included as a term in the address computation performed for an immediately following complex specifier; the next byte must have a register mode field with a value of 6 to F hexadecimal, and a register address field which addresses a base register for the complex specifier.

If the register mode field has a hexadecimal value of five, then the specifier is a "register specifier" in which the operand value is found in the general purpose register indicated by the register address field or, if the specifier is for the destination of the instruction, then the specifier specifies that the result is to be stored in the general purpose register indicated by the register address field.

For each of register modes 6, 7 and 8, the designated register contains the memory address for the operand. For a source operand, the operand value is read from this memory address, and for a destination operand, the result is written to this memory address. In mode 6 the designated register contains the address of the operand. In register mode 7 the content of the designated general purpose register is first decremented before computation of the address; in mode 8 the content of the designated general purpose register is incremented after the register is used to compute the address. Register mode 9 is similar to register mode 8, except that the content of the designated general purpose register specifies the address in memory at which the operand address will be found rather than the operand itself.

Modes 10 through 15 are various kinds of "displacement modes." In a displacement mode a displacement value, which may comprise a byte, word, or longword in modes 10, 12 and 14 respectively, is added to the content of the designated general purpose register to obtain the operand address. The operand is determined in a similar fashion in modes 11, 13 and 15 except that the sum of the displacement value and the content of the general purpose register identifies a memory address at which the address of the operand can be found.

In modes 8 through 15, the register address field of the first byte of the operand specifier can designate any of the general purpose registers, including register R15 which is the program counter. For modes 8 and 9, if the program counter is addressed, the value of the program counter itself is incremented which causes program execution to jump over operand data or an operand address disposed in the instruction stream. The instruction decoded therefore must recognize these special cases of modes 8 and 9 in which the program counter is addressed. In mode 8, this special case is known as an "immediate" addressing mode, and for mode 9 it is known as an "absolute" addressing mode, specifically, when modes 8 and 9 are decoded for any of the general purpose registers 0 through 14, the next specifier or the next operation code appears immediately following the byte designating the mode and the general purpose register. For the immediate mode, however, a number of bytes of the immediate data appear and the number of bytes is determined by the specifier's datatype.

Figure 28:
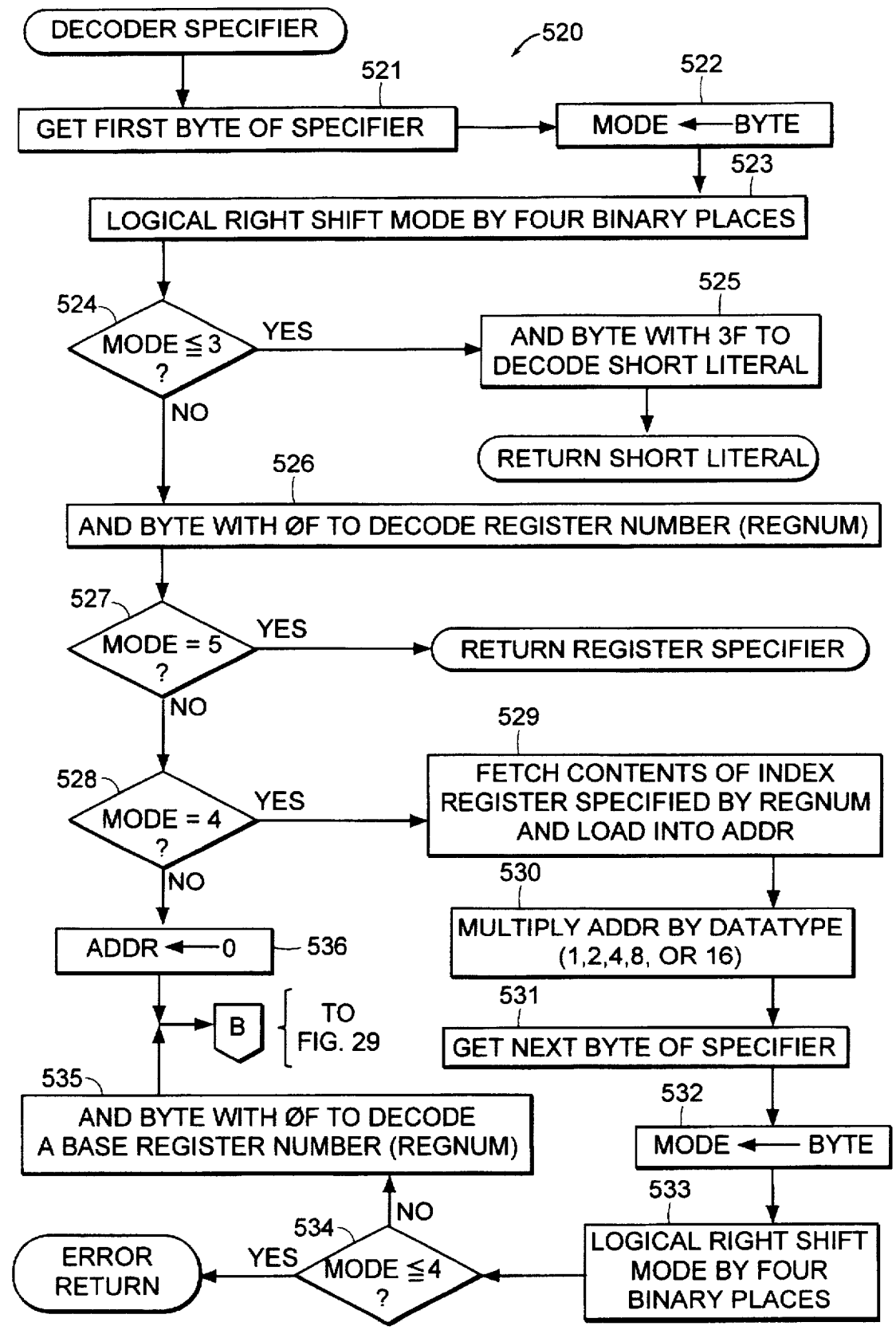
FIGS. 28 to 31 together comprise a flowchart of a simplified subroutine for decoding a variable-length specifier having the modes shown in FIG. 27.

Turning now to FIG. 28, there is shown the first figure of a flowchart generally designated 520 of a simplified subroutine for decoding a variable-length specifier. A subroutine for decoding all of the VAX (trademark) specifiers is listed below in Appendix I. The flowchart 520, however, illustrates the primary features of the decoding process, and shows the logging of register values changed by the processing of auto-increment and auto-decrement specifiers.

In the first step 521 of FIG. 28, the data processor fetches the first byte of the specifier, and places the byte in a variable BYTE. Then in step 522, a copy of the byte is placed in the variable MODE. Next, in step 523, MODE is logically right-shifted by four binary places in order to decode the register mode field. In step 524, execution branches depending on whether MODE is less than or equal to three. If so, then the specifier is a short literal specifier. Therefore, in step 525, the short literal is decoded by logically ANDing the first byte of the specifier with a hexadecimal value of 3F, and execution returns with the short literal specifier in the variable BYTE.

When the value of MODE is not less than or equal to three, then the first byte of the specifier includes a register address field specifying a particular general purpose register. In step 526, the register number of this general purpose register is decoded by logically ANDing the byte of the first specifier with a hexadecimal value of 0F, and placing the result in a variable REGNUM. Then in step 527, execution returns when MODE has a value of 5. In this case, the specifier is a register specifier in the variable REGNUM. Otherwise, execution continues from step 527 to step 528.

In step 528, execution branches when MODE is equal to four. In this case, the register number decoded in step 526 (REGNUM) indicates an index register. Therefore, in step 529, the contents of the index register are fetched and loaded into a variable ADDR. In step 530, the value in ADDR is multiplied by 1, 2, 4, 8, or 16, depending on whether the datatype associated with the instruction opcode is a byte, word, longword, quadword, or octaword. Then in step 531, the next byte of the specifier is fetched. In step 532, this next byte is copied to the variable MODE. In step 533, the content of the variable MODE is logically right-shifted by four binary places in order to decode the register mode field of the byte fetched in step 531. This register mode field should have a value greater than five. If not, as tested in step 534, execution returns to an error handler. Otherwise, execution continues in step 535 by computing the logical AND of the variable BYTE with a hexadecimal value of "0F" in order to decode a base register number, which is placed in the variable REGNUM.

If in step 528, the value of MODE was not equal to four, then the register number decoded in step 526 (REGNUM) is a base register number, and execution continues from step 528 to step 536, where the variable ADDR is set equal to zero. After step 536, execution continues in FIG. 29.

Figure 29:
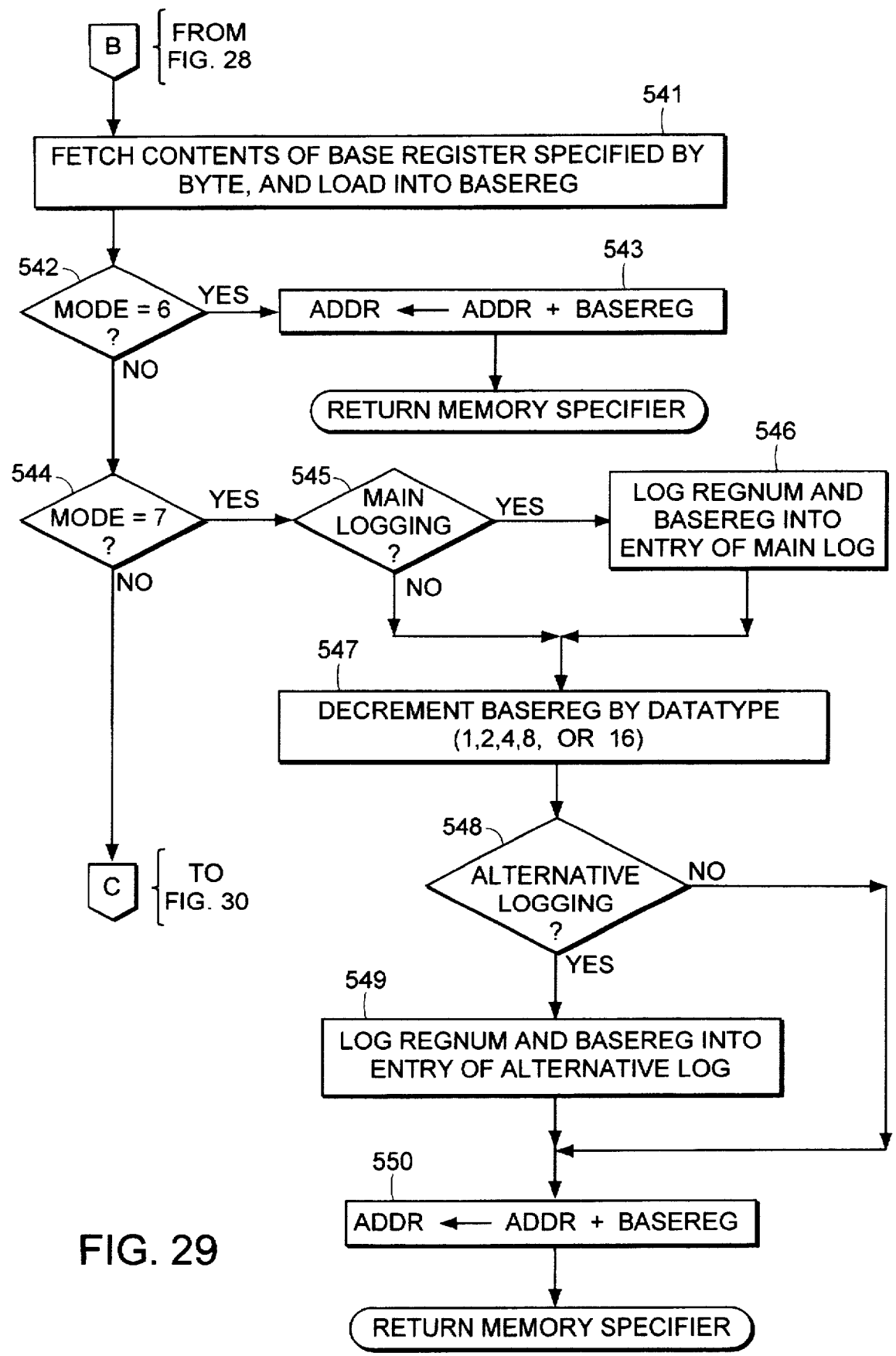

Turning now to FIG. 29, there is shown a first step 541 that is reached after either steps 535 or 536 in FIG. 28. In step 541, the data processor fetches the contents of the base register specified by the variable REGNUM, and the contents are loaded into a variable BASEREG. Then in step 542, execution branches when MODE is equal to six. In this case, the specifier being decoded has a "register deferred" mode. Execution branches from step 542 to step 543, where the address of the specifier is computed by adding the variable BASEREG to the variable ADDR, storing the sum in the variable ADDR, and execution returns with the memory specifier in the variable ADDR.

When MODE is not equal to six, then execution continues from step 542 to step 544. In step 544, execution branches from step 544 to step 545 when MODE is equal to seven. In this case, the specifier has an autodecrement mode, which changes the contents of the base register. Execution branches from step 545 to step 546 when the bookmark is pointing to the main log. In step 546, the base register number (REGNUM) and contents of the base register (BASEREG) are logged into an entry of the main log. The entry of the main log also includes an indication that the entry is for a register change, instead of a change to a memory location. After steps 545 or step 546, execution continues to step 547. In step 547, the variable BASEREG is decremented by either 1, 2, 4, 8, or 16 depending on whether the datatype of the instruction opcode is a byte, word, longword, quadword, or octaword, respectively. Then in step 548, execution branches depending on whether the bookmark is pointing to an alternative log. If so, then in step 549, the base register number REGNUM new value for the base register in the variable BASEREG are logged into an entry of the alternative log pointed to by the bookmark. After steps 548 or 549, in step 550, the address of the specifier is computed by adding the variable BASEREG to the variable ADDR and placing the sum in the variable ADDR, and execution returns with the memory specifier in the variable ADDR.

Figure 30:
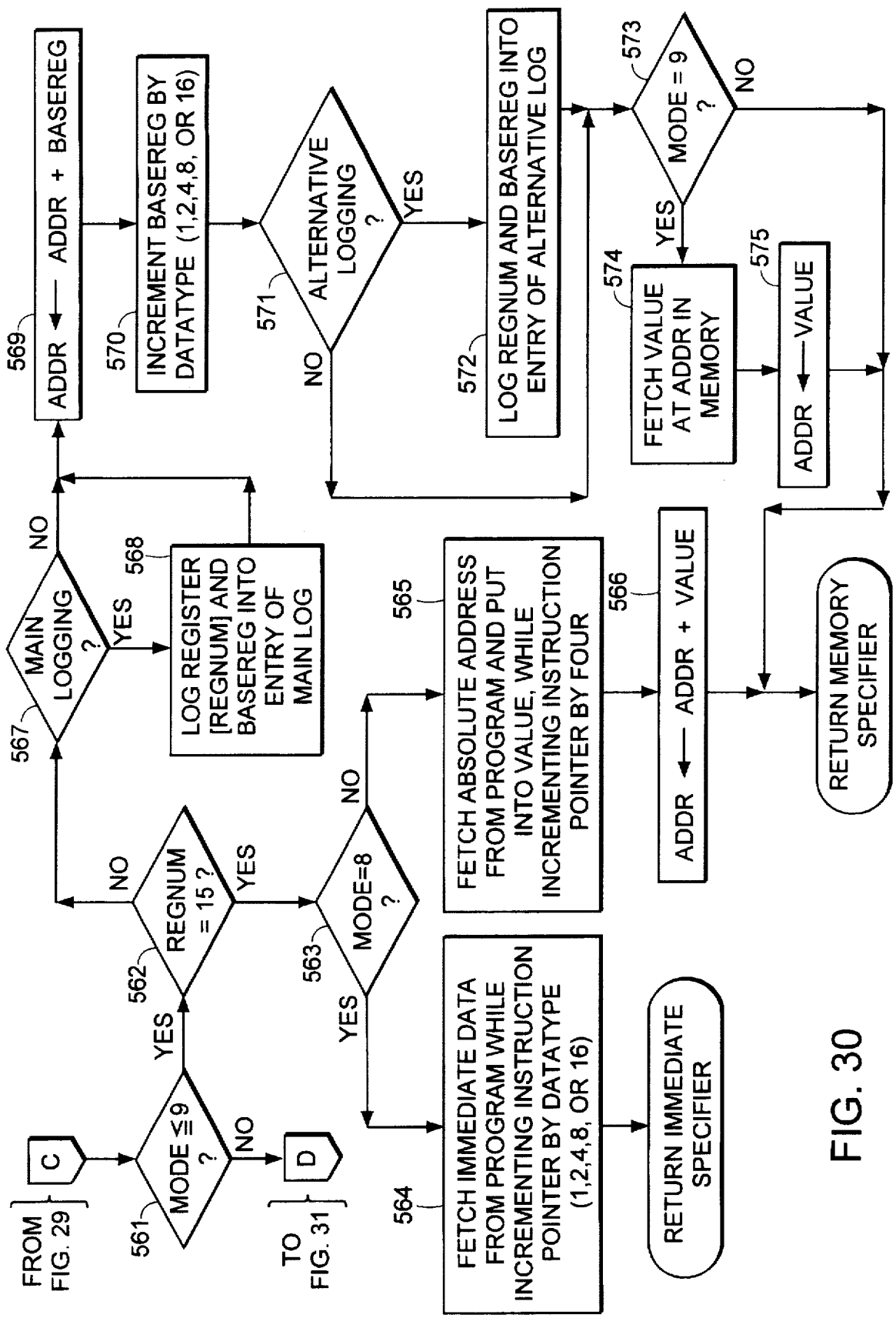

When step 544 finds that the variable MODE is not equal to seven, then execution continues in step 561 of FIG. 30. In step 561, execution branches to step 562 when the value of MODE is less than or equal to nine. In this case, the specifier has an autoincrement mode. Execution branches from step 562 to step 563 when the base register is the program counter (REGNUM=15). Execution branches from step 563 to step 564 when MODE has a value of eight, indicating an autoincrement immediate mode. In step 564, immediate data is fetched from the assembly language or machine language program while incrementing the instruction pointer by either 1, 2, 4, 8, or 16 depending on the datatype for the instruction opcode. Execution then returns with the immediate specifier.

When MODE is not equal to eight, then execution branches from step 563 to step 565 in order to decode an absolute mode specifier. In step 565, the absolute address is fetched from the machine language program, and placed into the variable VALUE, while incrementing the decode pointer by four. As introduced above with reference to FIG. 3, the decode pointer points to the next byte to be decoded in the machine language program. The decode pointer is advanced during instruction decoding, and its value corresponds to the "update value" of the program counter general purpose register if the machine language program were executed directly by the data processor. Therefore, during forward interpretation, the last log entry for an interpreted instruction is a log of the decode pointer, in order to indicate the changed value of the program counter register. Then in step 566, the data processor computes the specifier address by adding the variable VALUE to the variable ADDR and storing the sum in the variable ADDR, and execution returns with the memory specifier in the variable ADDR.

When REGNUM is not equal to fifteen, execution branches from step 562 to step 567 in order to process an autoincrement specifier. When the bookmark is pointing to the main log, execution branches from step 567 to step 568. In step 568, the base register number REGNUM and the old value of the base register BASEREG are logged into an entry of the main log. After either steps 567 or 568, execution continues in step 569 where the data processor computes the address of the autoincrement specifier by adding the variable BASEREG to the variable ADDR and storing the sum. Then in step 570, the variable BASEREG is incremented by 1, 2, 4, 8, or 16 depending on whether the datatype is a byte, word, longword, quadword, or octaword, respectively. Execution then continues to step 571, where execution branches depending on whether the bookmark is pointing to an alternative log. If so, then in step 572, the base register number REGNUM and the new value of the base register BASEREG are logged into an entry of the alternative log pointed to by the bookmark. From either steps 571 or 572, execution continues to step 573. In step 573, execution branches to step 574 when MODE has a value of nine. This occurs for the autoincrement deferred mode. In step 574, the data processor addresses the memory with the address in the variable ADDR, and places the fetched value in the variable VALUE. In step 575, the variable ADDR is set to the value in the variable VALUE. After steps 573 or 575, execution returns with the memory specifier in the variable ADDR.

Figure 31:
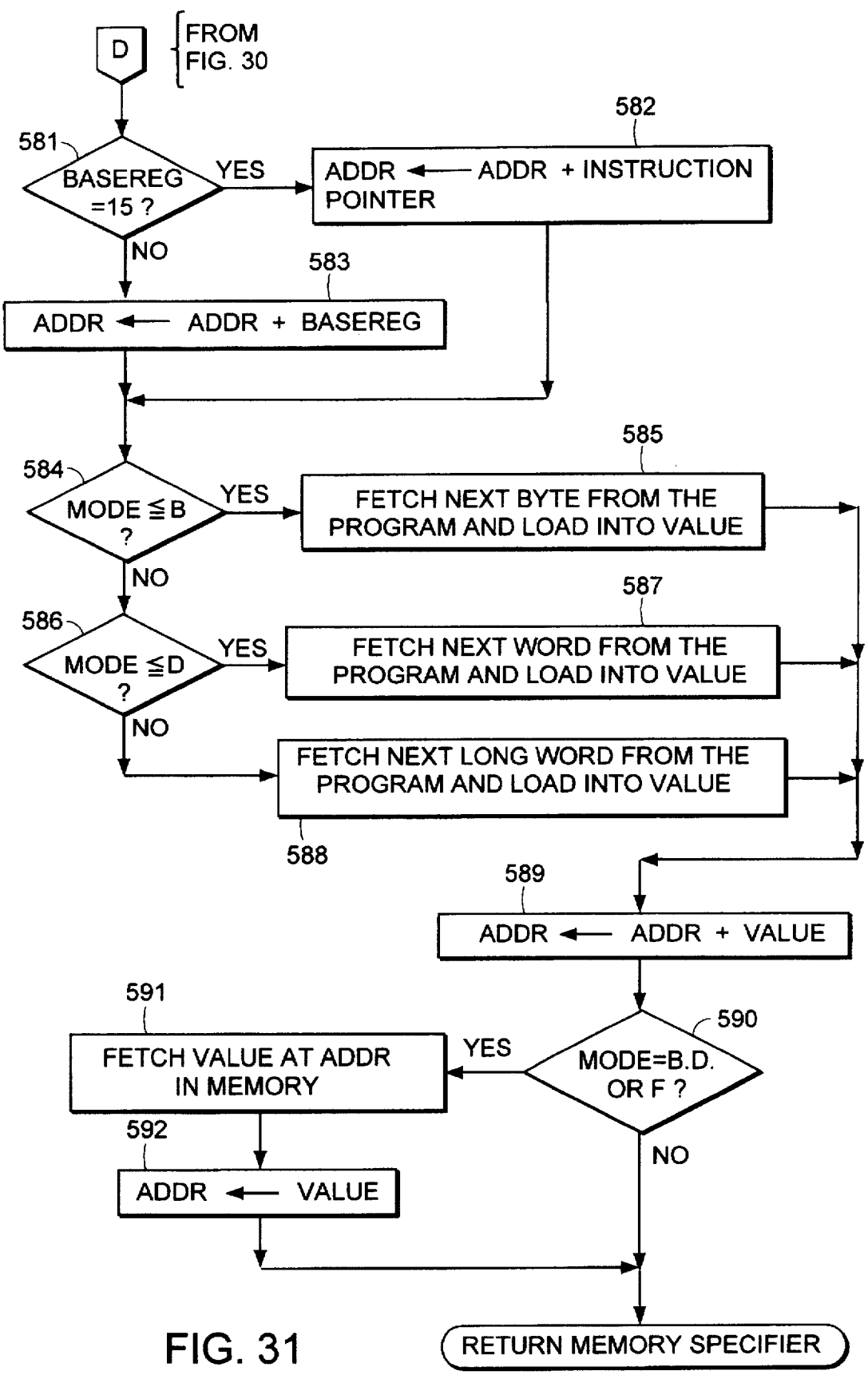

When step 561 finds that MODE has a value greater than nine, then execution continues in step 581 of FIG. 31. In step 581, the value of MODE is compared to fifteen to determine whether the base register is the program counter. If so, then the value of the program counter should be taken from the instruction counter rather than fetched by searching the logs or inspecting the state for the computer program. Therefore, when the value of BYTE is equal to fifteen, execution branches to step 582 where the decode pointer is added to the variable ADDR and the sum is placed in the variable ADDR. Otherwise, in step 583, the variable BASEREG is added to the variable ADDR and the sum is placed in the variable ADDR to begin the computation of the address for a displacement mode specifier. The displacement further includes a byte, word, or longword displacement fetched from the program. Execution continues from either step 582 or 583 to 584. When the value of MODE is less than or equal to a hexadecimal value of "B", then execution branches from step 584 to step 585. In step 585, the next byte is fetched from the program and loaded into the variable VALUE. Otherwise, execution continues from step 584 to step 586. When the value of MODE is less than or equal to a hexadecimal value of "D", then execution branches from step 586 to step 587. In step 587, the data processor fetches the next word from the program and loads the word into the variable VALUE. When the value of MODE is not less than or equal to a hexadecimal value of "D", then execution continues from step 586 to step 588 where the data processor fetches the next longword from the program and loads the longword into the variable VALUE. Execution continues from step 585, 587, or 588 to step 589 where the variable VALUE is added to the variable ADDR, and the sum is placed in the variable ADDR. Then in step 590, execution branches depending on whether the value of MODE is equal to a hexadecimal value of B, D, or F. If so, then the displacement specifier is a deferred mode specifier. In step 591, the data processor addresses memory with the address in the variable ADDR, and places the addressed value in the variable VALUE. Then in step 592, the variable ADDR is assigned the value in the variable VALUE, and execution returns with the memory specifier in the variable ADDR. Execution also returns with the memory specifier in the variable ADDR after step 590 when the value of MODE is not equal to a hexadecimal value of B, D, or F.

In view of the above, there has been described an interactive debugger that can step forwards and backwards through an application program while displaying simulated values for specified registers and memory locations. At any time during interactive debugging, the user may specify a changed value for a register or memory location, and then continue forward through the program. Moreover, the user may rapidly return to any previously-visited location in the sequence of instruction execution.

It should be apparent to persons skilled in the computer art that the embodiment shown in the figures can be modified in various ways without departing from the scope of the invention as defined by the appended claims. The entries of the main log, for example, include the old values of registers and memory locations having contents that are changed by the forward-executed instructions, but the entries of the main log could also include the new values of these registers and memory locations. The logging of new as well as old values could be used to speed-up simulated execution in the main log, especially in the single-step mode, because then the value of each of the display parameters could be updated after a forwards step by looking in the main log for a new value logged by the stepped-over instruction, and the value of each of the display parameters could be updated after a backwards step by looking in the main log for an old value logged by the stepped-over instruction. In a similar fashion, the entries of the alternative logs could include both old and new values of the registers and memory locations having contents that are changed by the forward-interpreted instructions, and the logging of both the old and new values in the alternative logs could be used for speeding-up forwards and backwards simulated execution in the alternative logs.

APPENDIX I

VAX (Trademark) SPECIFIER DECODING SUBROUTINE

```
ROUTINE Parse_Operand( Pointer_Ref,
                      Kernel_State : REF $KRNLSTA,
                      Context,
                      Second_Context,
                      Modified_Operand
                     ) =
!+
! FUNCTION
!    Parse the operand and log if modified
! INPUTS:
!    Pointer_Ref -      Address of the operand pointer within
!                       the instruction stream (i.e.
!                       Pointer_Ref points to a PC-
!                       equivalent which points to the
!                       instruction stream)
!    Kernal_State -     State of the user's kernal
!    Context -          The instruction operand context
!    Second Context -   Context the second (next) operand is in.
!                       This is only non-zero in the case
!                       of an immediate mode, and only for
!                       SIMPLE_n_OPERAND instructions.
!    Modified_Operand-  TRUE if this operand is modified.
!
! VALUE:
!    The effective address of the operand (0 if a register)
```

APPENDIX I-continued

VAX (Trademark) SPECIFIER DECODING SUBROUTINE

```
! SIDE EFFECTS:
!    The caller's pointer into the instruction stream is updated.
    BEGIN
    BIND
    Pointer = .Pointer_Ref;
BIND
    REGISTER_SET = KERNEL_STATE-
    [KRNLSTA$A_REGISTER_SET] :
            REF VECTOR [,LONG];
LOCAL
    Mode_Specifier,    !    Mode nibble
    Register_Number,   !    Register nibble
    Was_Register,      !    TRUE if this was a plain
                            register spec (e.g. "R2")
    Actual_Address,    !    Actual address referred to
    Old_Value,         !    Contents of above
    First_Register;    !    Contents of register named in
                            register nibble
SELECTONE .CONTEXT OF SET
    [CONTEXT_P, CONTEXT_T]:
        BEGIN
        LOCAL
            Len_Addr,
            Len,
            Dest;
        !    We've got a pseudo context value representing a group of
        !    operands for string or packed class instructions. Decode
        !    them here by making recursive calls to Parse_Operand.
        !
        Len_Addr =    Parse_Operand(POINTER,
                          .Kernel_State,
                          CONTEXT_WU,
                          0,
                          False );
        Dest    =     Actual_Address =
                          Parse_Operand(POINTER,
                              .Kernel_State,
                              CONTEXT_B,
                              0,
                              False );
        IF .Modified_Operand
        THEN
            BEGIN
            Len = FETCH_USER_MEMORY( Len_Addr,
                  CONTEXT_W );
            DBG$HLog_Old_Memory( .Dest, .Len);
            END;
        END;
    [CONTEXT_M,CONTEXT_V]:
        !    We've got a pseudo context value representing a group of
        !    operands for bit class instructions. Decode them here by making
        !    recursive calls to Parse_Operand.
        BEGIN
        LOCAL
            Pos, !    Can't be negative
            Size !      "
            Base,
            Non_Byte_Part,
            Save_Reg;
        Pos    =      Parse_Operand(POINTER,
                          .Kernel_State,
                          CONTEXT_BU,
                          0,
                          False);
        IF .Context NEQ CONTEXT_V
        THEN
            Size = Parse_Operand(POINTER,
                       .Kernel_State,
                       CONTEXT_BU,
                       0,
                       False)
        ELSE
            Size = 1;
        !    What if BASE is a register? Then the recursive call
        !    will come back "0", so we'll have to save the register
        !    nibble, just in case.
        !
        Save_Reg = .(.Pointer)<0,4,0>;
        !    Can't use FETCH_FROM_I..., it'll bump POINTER.
        Base = Parse_Operand(POINTER,
                   .Kernel_State,
                   CONTEXT_L,
                   0,
                   False);
        Non_Byte_Part =    .Pos AND NOT %B'111'; ! Odd bit index
        IF .Base NEQA 0
        THEN
            !    Memory modified
            !
            BEGIN
            Actual_Address = .Base + (.Pos / %BPUNIT ); !Byte index
            part
            IF .Moditied_Operand
            THEN
                !    All this work to not log high bytes is only to prevent
                !    accvios at a page boundary--otherwise, grabbing the
                !    whole longword would be easier.
                DBG$HLog_Old_Memory( .Actual_Address, ((.Size +
                .Non_Byte_Part + 7) / %BPUNIT) );
            END
        ELSE
            BEGIN
            Actual_Address = 0;
            IF .Modified_Operand
            THEN
                DBG$HLog_Old_Register( .Save_Reg,
                FETCH_USER_REGISTER(
                .Save_Reg ));
            END;
        END;
    [CONTEXT_K]:
        !    We've got a context value that indicates the next value in
        !    the instruction stream is a constant. Bump over it. To do
        !    this correctly we need to know the context.
        !
        !    E.g., last operand of BUGL and BUGW.
        BEGIN
        Fetch_From_Instruction( Pointer, .Second_Context );
        Actual_Address = .Op_Buffer[0,0,32,0];
        END;
    [OTHERWISE]:
        BEGIN
        !    We've got a context value that corresponds to a VAX
        !    operand context. Do your basic operand decoding here.
        !
        Fetch_From_Instruction( Pointer, CONTEXT_BU );
        Mode_Specifier = .Op_Buffer[0,4,4,0];
        Register_Number = .Op_Buffer[0,0,4,0];
        IF .Mode_Specifier GTR 3
        THEN
            ! No register at all if this is a literal.
            !
            BEGIN
            IF .Register_Number GEQ
            DBG$K_NUM_REAL_REGISTERS
                OR .Register_Number LSS 0
            THEN
                0; !    Error in register number!
            FIRST_Register =
                     FETCH_USER_REGISTER-
                     ( .Register_Number );
            IF .Register_Number EQL PC_reg_num
            THEN
                !    Must use updated value of PC after fetch
                !    from instruction stream.
                !
                First_Register = .Pointer;
            END;
        Was_Register = FALSE;
        CASE .MODE_SPECIFIER FROM 0 TO 15 OF
        SET
        [0,1,2,3]:
            ! Literal –    this nibble and the next nibble are the
            !              literal.
```

APPENDIX I-continued

VAX (Trademark) SPECIFIER DECODING SUBROUTINE

```
        !
        BEGIN
        Actual_Address = .Op_Buffer[0,0,8,0];
        END;
[4]:    ! Indexed:           <address>[Rx]
        !
        BEGIN
        LOCAL
            Base_Operand;
        Base_Operand =      Parse_Operand(
                                Pointer,
                                .Kernel_State,
                                .Context,
                                .Second_Context,
                                FALSE );
        IF .Register_Number EQL PC_reg_num
        THEN
            ! Must use updated value of PC after fetch
            !
            First_Register = .Pointer;
        Actual_Address = .First_Register * .Data_Size[.Context]
            + .Base_Operand;
        END;
[5]:    ! Register:   Rn
        !
        BEGIN
        Was_Register =      TRUE;
        Actual_Address =    0;    ! Register
        END;
[6]:    ! Register deferred:     (Rn)
        !
        Actual_Address = .First_Register;
[7]:    ! Autodecrement: -(Rn)
        !
        BEGIN
        IF .Register_Number EQL PC_reg_num
        THEN
        %( This doesn't happen, it's an illegal mode I think. )%
        ELSE
            !  Log the old value of this register.
            !
            DBG$HLog_Old_Register-
            ( . Register_Number,
              .First_Register );
        Actual_Address =
            .First_Register - .Data_Size[.Context];
        END;
[8]:    ! Autoincrements (Rn)+
        !
        BEGIN
        IF .Register_Number EQL PC_reg_num
        THEN
            ! Immediate mode program counter
            !   addressing: (PC) +
            ! A constant operand follows the address
            ! mode. We need to bump the pointer over the
            ! operand.
            !
            Fetch_From_Instruction-
            ( POINTER, .CONTEXT )
        ELSE
            !  Log the old value of this register.
            !
            DBG$HLog_Old_Register
            ( . Register_Number, .First_Register );
        Actual_Address = .First_Register; !** Don't update
        END;
[9]: !  Autoincrement Deferred:  @(Rn)+
        !
        BEGIN
        IF .Register_Number EQL PC_reg_num
        THEN
            ! Absolute mode program counter addressing:
            !   @(PC)+
            ! An absolute address follows the operand.
            ! We need to bump the pointer over the operand.
            !
            Fetch_From_Instruction( POINTER, CONTEXT_L )
        ELSE
            !  Log the old value of this register.
            !
            DBG$HLog_Old_Register ( .Regiser_Number,
            .First_Register );
        Actual_Address = ..First_Register; !** Don't update
        END;
[10]:
        !   Byte Displacement Mode: @B^d(Rn)
        !
        BEGIN
        Fetch_From_Instruction( Pointer, CONTEXT_B );
        IF .Register_Number EQL PC_reg-num
        THEN
            ! Must use updated value of PC
            !
            First_Register = .Pointer;
        Actual_Address = .First_Register + .Op_Buffer-
        [SIGNED_BYTE];
        END;
[12]:
        !   Word Displacement Mode: @W^dd(Rn)
        !
        BEGIN
        Fetch_From_Instruction( Pointer, CONTEXT_W );
        IF .Register_Number EQL PC_reg_num
        THEN
            ! Must use updated value of PC
            !
            First_Register = .Pointer;
        Actual_Address =
            .First_Register + .Op_Buffer[SIGNED_WORD];
        END;
[14]:
        !   Long Displacement Mode: @L^dddd(Rn)
        !
        BEGIN
        Fetch_From_Instruction( Pointer, CONTEXT_L );
        IF .Register_Number EQL PC_reg_num
        THEN
            ! Must use updated value of PC
            !
            First_Register = .Pointer;
        Actual_Address =
            .First_Register + .Op_Buffer[SIGNED_LONG];
        END;
[11]:
        !   Deferred Byte Displacement Mode: @B^d(Rn)
        !
        BEGIN
        Fetch_From___Instruction( Pointer, CONTEXT_B );
        IF .Register_Number EQL PC_reg_num
        THEN
            ! Must use updated value of PC
            !
            First_Register = .Pointer;
        Actual_Address = FETCH_USER_MEMORY
            ( (.First_Register +
              .Op_Buffer[SIGNED_BYTE]), CONTEXT_L );
        END;
[13]:
        !   Deferred Word Displacement Mode: @W^dd(Rn)
        !
        BEGIN
        Fetch_From___Instruction( Pointer, CONTEXT_W );
        IF .Register_Number EQL PC_reg_num
        THEN
            ! Must use updated value of PC
            !
            First_Register = .Pointer;
        Actual_Address = FETCH_USER_MEMORY-
        ( (.First_Register + .Op_Buffer[SIGNED_WORD]),
                        CONTEXT_L );
        END;
[15]:
        !   Deferred Long Displacement Mode:
```

APPENDIX I-continued

VAX (Trademark) SPECIFIER DECODING SUBROUTINE

```
    @L^dddd(Rn)
    !
    BEGIN
    Fetch_From_Instruction( Pointer, CONTEXT_L );
    IF .Register_Number EQL PC_reg_num
    THEN
        !   Must use updated value of PC
        !
        First_Register = .Pointer;
        Actual_Address = FETCH_USER_MEMORY-
        ( (.First_Register + .Op_Buffer-
            [SIGNED_LONG]), CONTEXT_L );
        END;
    TES;
!   Do any logging required.
!
IF .Modified_Operand
THEN
    BEGIN
    IF .Was_Register
    THEN
        BEGIN
        Old_Value = FETCH_USER_REGISTER-
        ( .Register_Number ); DBG$HLog_Old_Register-
        ( .Register_Number, .Old_Value );
        END
    ELSE
        BEGIN
        !** Old_Value = FETCH_USER_MEMORY-
                        ( .Actual_Address, .Context );
        DBG$HLog_Old_Memory( .Actual_Address,
        .Data_Size[.Context] );
        END;
    END;
TES;
!   Return the effective address.
!
.Actual_Address
END;
END
ELUDOM
```

What is claimed is:

1. A method of operating a digital computer for interactive debugging of a computer program; said digital computer having a data processor, a random-access memory, and a display for displaying information to a user; said data processor having a plurality of registers; said computer program including a sequence of instructions; said method comprising the steps of:

a) executing said sequence of instructions in a forward direction in order to create a current state of said memory and said registers for said computer program, maintaining said current state, and, for each instruction that is executed, recording in a main log pre-existing values of any registers and memory locations that are changed by said each instruction, whereby said main log does not include said current state; and b) after said step a), simulating reverse execution of said computer program by displaying to said user contents of specified ones of said registers and memory locations that existed during forward execution of the computer program at a specified time in the past; wherein the contents of the specified ones of said registers and memory locations are reconstructed for said computer program by performing the steps comprising i) forward searching in said main log for entries that include values of said specified ones of said registers and memory locations; wherein, for each of said specified ones of said registers and memory locations, said main log is searched beginning at a location corresponding to said specified time in the past and continuing until either a value is found for said each of said specified ones of said registers and memory locations or until an end of said main log is reached, and ii) when the end of said main log is reached, obtaining a value from said current state for said each of said specified ones of said registers and memory locations for which a value had not been found in said main log.

2. The method as claimed in claim 1, further comprising a step c) of receiving from said user a changed value for a selected one of said registers and memory locations, and then beginning forward interpretation of said computer program at a point in said sequence of instructions that was reached during said step a) at said specified time in the past, without changing said current state for said computer program, and during said forward interpretation, recording in an alternative log new values of said registers and memory locations generated by interpreted instructions of said computer program.

3. The method as claimed in claim 2, further comprising the step d) of displaying to said user contents of specified ones of said registers and memory locations that are fetched by searching said alternative log, in order to simulate said state for said computer program at an intermediate location in said alternative log.

4. The method as claimed in claim 3, further comprising a step e) of receiving from said user an additional changed value for an additional selected one of said registers and memory locations, and then continuing forward interpretation of said computer program from a point in said sequence of instructions that was reached during said step c) when logging in said alternative log at said intermediate location, and creating an additional alternative log of new values of said registers and memory locations generated by the continued forward interpretation of said computer program.

5. The method as claimed in claim 4, wherein the alternative logs are linked to each other and to said main log to form a tree data structure.

6. The method as claimed in claim 2, wherein values of registers and memory accessed by interpreted instructions are fetched by first searching said alternative log in a reverse direction, and when a value is not found in said alternative log, then searching said main log in a forward direction, and when a value is not found in said main log, then fetching a value from said current state for said computer program.

7. The method as claimed in claim 1, wherein said main log is comprised of entries arranged in a double-linked list in said random-access memory.

8. The method as claimed in claim 7, wherein said specified point in time is specified by a pointer pointing to a particular one of said entries.

9. The method as claimed in claim 1, wherein said specified ones of said registers and memory locations include a program counter register.

10. The method as claimed in claim 1, wherein said specified ones of said registers and memory locations include locations of said memory containing a stack used by said data processor.

11. The method as claimed in claim 1, wherein said specified ones of said registers and memory locations include a memory location at an address selected by said user.

12. The method as claimed in claim 1, wherein said specified point of time in the past is specified by the user single-stepping backwards and forwards between neighboring ones of said instructions in said sequence of instructions.

13. The method as claimed in claim 1, wherein said instructions are machine-language instructions.

14. A method of operating a digital computer for interactive debugging of a computer program; said digital computer having a data processor, a random-access memory, and a display for displaying information to a user; said data processor having a plurality of registers; said computer program including a sequence of instructions; said method comprising the steps of:
   a) executing said sequence of instructions in a forward direction in order to create a current state of said memory and said registers for said computer program, maintaining said current state, and, for each instruction that is executed, recording in a main log pre-existing values of any registers and memory locations that are changed by said each instruction, whereby said main log does not include said current state;
   b) after said step a), simulating reverse execution of said computer program by displaying to said user contents of specified ones of said registers and memory locations that existed during forward execution of the computer program at a specified time in the past; wherein the contents of the specified ones of said registers and memory locations are reconstructed for said computer program by forward searching in said main log for entries that include said pre-existing values of said specified ones of said registers and memory locations; and
   c) after said step b), receiving from said user a changed value for a selected one of said registers and memory locations, and then beginning forward interpretation of said computer program at a point in said sequence of instructions that was reached during said step a) at said specified time in the past, and during said forward interpretation, recording in an alternative log new values of said registers and memory locations generated by interpreted instructions of said computer program.

15. The method as claimed in claim 14, further comprising the step d) of displaying to said user contents of specified ones of said registers and memory locations that are fetched by searching said alternative log, in order to simulate said state for said computer program at an intermediate location in said alternative log.

16. The method as claimed in claim 15, further comprising a step e) of receiving from said user an additional changed value for an additional selected one of said registers and memory locations, and then continuing forward interpretation of said computer program from a point in said sequence of instructions that was reached during said step c) when logging in said alternative log at said intermediate location, and creating an additional alternative log of new values of said registers and memory locations generated by the continued forward interpretation of said computer program.

17. The method as claimed in claim 16, wherein the alternative logs are linked to each other and to said main log to form a tree data structure.

18. The method as claimed in claim 14, wherein, for any of said specified ones of said registers and memory locations not having said pre-existing values stored in said main log, the contents are reconstructed from said current state of said computer program.

19. A digital computing system for interactive debugging of a computer program, said computer program including a sequence of instructions, said digital computing system comprising, in combination:

a data processor having a plurality of registers;

a display connected to said data processor for displaying data to a user;

a keyboard connected to said data processor for receiving commands from said user; and an addressable memory connected to said data processor for retrieving data and instructions of said computer program from memory locations addressed by said data processor;

wherein said digital computing system includes
   a) means for executing said sequence of instructions in a forward direction in order to create a current state of said memory and said registers for said computer program, and for each instruction that is executed, recording in a main log pre-existing values of any registers and memory locations that are changed by said each instruction, whereby said main log does not include said current state;
   b) means for simulating reverse execution of said computer program by displaying to said user contents of specified ones of said registers and memory locations that existed during forward execution of the computer program at a specified time in the past, and including means for reconstructing the contents of the specified ones of said registers and memory locations for said computer program by forward searching in said main log for entries which include said pre-existing values of said specified ones of said registers and memory locations; and
   c) means for receiving from said user a changed value for a selected one of said registers and memory locations, and then beginning forward interpretation of said computer program at a present location in said sequence of instructions using said changed value, and, during said forward interpretation, recording in an alternative log new values of said registers and memory locations generated by interpreted instructions of said computer program.

20. The digital computing system as claimed in claim 19, wherein said means for reconstructing the contents of the specified ones of said registers and memory locations includes means for searching for a value of each of said specified ones of said registers and memory locations by first searching said main log beginning at a location corresponding to said specified time in the past and continuing until either a value is found for said each of said specified ones of said registers and memory locations, or until an end of the main log is reached, and when the end of said main log is reached, obtaining a value for said each of said specified ones of said registers and memory locations from said current state for said computer program.

21. The digital computing system as claimed in claim 19, further comprising means for fetching values of said registers and memory locations accessed by interpreted instructions by first searching said alternative log for new values generated by previously interpreted instructions, and later searching said main log when a value is not found in said alternative log, and finally fetching a value from said current state for said computer program when a value is not found in said main log.

22. The digital computing system as claimed in claim 19, wherein, for any of said specified ones of said registers and memory locations not having said pre-existing values stored in said main log, the contents are reconstructed from said current state of said computer program.

* * * * *